US007124065B2

(12) United States Patent  
MacAuslan

(10) Patent No.: US 7,124,065 B2
(45) Date of Patent: Oct. 17, 2006

(54) DETERMINING A TANGENT SPACE AND FILTERING DATA ONTO A MANIFOLD

(75) Inventor: Joel M. MacAuslan, Nashua, NH (US)

(73) Assignee: Speech Technology and Applied Research Corporation, Bedford, MA (US)

( * ) Notice: Subject to any disclaimer, the term of this patent is extended or adjusted under 35 U.S.C. 154(b) by 516 days.

(21) Appl. No.: 10/662,991

(22) Filed: Sep. 15, 2003

(65) Prior Publication Data

US 2004/0107079 A1 Jun. 3, 2004

Related U.S. Application Data

(63) Continuation-in-part of application No. 09/425,784, filed on Oct. 25, 1999, now abandoned.

(60) Provisional application No. 60/105,690, filed on Oct. 26, 1998.

(51) Int. Cl.
*G06F 7/60* (2006.01)

(52) U.S. Cl. .......................... 703/2; 702/109; 702/108; 700/28; 700/29; 700/31

(58) Field of Classification Search ............... 703/2; 702/108–126; 700/28–29, 31
See application file for complete search history.

(56) References Cited

U.S. PATENT DOCUMENTS

| 4,973,111 A | * | 11/1990 | Haacke et al. | 324/309 |
| 5,453,940 A | * | 9/1995 | Broomhead et al. | 702/109 |
| 5,493,516 A | * | 2/1996 | Broomhead et al. | 702/109 |
| 5,835,682 A | * | 11/1998 | Broomhead et al. | 706/14 |

OTHER PUBLICATIONS

Bajaj, C. et al. "Higher-Order Interpolation and Least-Squares Approximation Using Implicit Algebraic Surfaces." ACM Transactions on Graphics, vol. 12, No. 4, Oct. 1993.*
Sherbrooke, E. et al. "Computation of the Medial Axis Transform of a 3-D Polyhedra" ACM 1995.*
Malik, J. et al. "Computing Local Surface Orientation and Shape from Texture for Curved Surfaces." International Journal of Computer Vision 1997.*
Dumortier, F. et al. "On the Decidability of Semi-Linearity for Semi-Algebraic Sets and its Implications for Spatial Data Bases." ACM 1997.*

* cited by examiner

Primary Examiner—Kamini Shah
Assistant Examiner—Kimberly A. Thornewell
(74) Attorney, Agent, or Firm—Hamilton, Brook, Smith & Reynolds, P.C.

(57) ABSTRACT

A technique for determining the number of constraints on a set of input data, or equivalently the topological dimension, especially when such data are produced by a nonlinear system, such as a pathological vocal system or econometric data and the like. The technique characterizes the tangent space about a predetermined base point by identifying a maximal set of non-redundant nonlinear fits to the data. It needs only a modest number of data points and does not assume prior knowledge of the functional form of the true constraints, other than smoothness. Each fit is equivalent to a set of contours (including curves, surfaces, and other manifolds), with the data themselves all lying along the zero-value contour of the fit. For each fit, the gradient of the fit at the base point in the uphill direction across the contours identifies the constraint direction. Considering all fits simultaneously, the number of constraint directions that are linearly independent provides the number of constraints in the neighborhood of the base point. The remaining unconstrained directions define the tangent space, and its dimensionality, which is precisely the number of linearly independent unconstrained directions, is precisely the inferred topological dimensionality of the original data.

17 Claims, 6 Drawing Sheets

US 7,124,065 B2

DETERMINING A TANGENT SPACE AND FILTERING DATA ONTO A MANIFOLD

RELATED APPLICATIONS

This application is a continuation-in-part of U.S. application Ser. No. 09/425,784, filed Oct. 25, 1999, now abandoned, which claims priority to U.S. Provisional Patent Application No. 60/105,690 filed Oct. 26, 1998, the entire teachings of which are incorporated herein by reference.

STATEMENT OF GOVERNMENT INTEREST

This invention was supported, at least in part, by contract number R44-DC 02343 with the United States' National Institutes of Health, who may have certain rights in this invention.

FIELD OF THE INVENTION

The present invention relates to analysis of nonlinear dynamical systems and in particular to a technique for determining the number of constraints, or equivalently the topological dimension, for a set of data.

BACKGROUND OF THE INVENTION

Certain practical applications of data processing systems relate to fitting models to sets of data. For example, in applications such as speech processing, signal processing, econometric data prediction, demographic analysis and the like, a set of data points are first collected from a real world process. It is desired then to find a set of mathematical equations which can be used to model the process accurately, for example, to predict the future behavior of the real-world system.

Determining the number of dimensional constraints on the collected data, or equivalently the topological dimension, $d_T$, is an important problem in the study of nonlinear system responses. For example, three-coordinate data may fill a volume, lie on a surface, be confined to a curve, or even degenerate to a point, reflecting zero, one, two, or three independent constraints (representing a topological dimension, $d_T$, of three, two, one, or zero, respectively). In the case of a real-world system in which linear responses may be assumed, this problem is able to be robustly solved by matrix decomposition techniques such as Singular Value Decomposition (SVD) or eigenvalue decomposition. These modeling methods assume that linear functions will adequately fit the data. However, such linear techniques cannot generally be directly applied to an instance of a nonlinear system with satisfactory results.

SUMMARY OF THE INVENTION

The present invention is a significant extension of Singular Value Decomposition (SVD) and eigenvalue decomposition techniques and robustly determines the constraints on experimental data without prior assumptions about their functional form. This strongly distinguishes it from "curve-fitting", in which the functional form is assumed and the data serve merely to determine some free parameters of the fit to the form. The method's essence is to characterize a "tangent space" at a base point as a simultaneous collection of all linear fits that best describe the immediate neighborhood of the point. The technique works for both clean and noisy data, applies to complicated curving and twisting constraints (e.g., abstract shapes or "geometries" of data), and requires only a modest number of data samples as input. It also accommodates prior knowledge, either positive or negative, about constraints.

More particularly, the technique relies on two principal process steps. First, an SVD process is used to identify a maximal set of non-redundant fits to the data, preferably single-constraint fits, all centered about some convenient "base" point. Each fit is equivalent to a set of contours (lines, surfaces, etc.), with the data themselves all lying along the zero-value or perfect-fit contour. The gradient of each fit at the base point, e.g., the "uphill" direction across the contours, identifies each constrained direction. The number of such directions that are linearly independent thus provides exactly the number of constraints in the neighborhood of the base point. Consequently, the directions (if any) that remain unconstrained also define the tangent space.

The fits found by the SVD process must then pass a statistical significance test, i.e., they are suppressed to the extent that even unconstrained data might frequently produce them. However, imperfect fits are accepted to the extent that measurement errors in the data could cause them. Care in evaluating the significance of the statistics allows both (a) fitting shapes that can be as complicated as the data can meaningfully describe, yet (b) accommodating measurement error.

Once the tangent space is found, it is a straightforward matter to project additional data points near the base point onto it, thus enforcing the constraints. The degree of mismatch (i.e., of constraint violation) provides a measure of the process noise, if this is not initially well known.

The method has been tested empirically on several data sets. It is also applied to one "higher-level" problem, to determine $d_T$ for strongly spatially varying geometry that can in some places mimic additional (false) constraints, with potentially severe consequences to analyzing, e.g., chaotic dynamical systems.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

1. An Exemplary Analysis Environment

Figure 1:
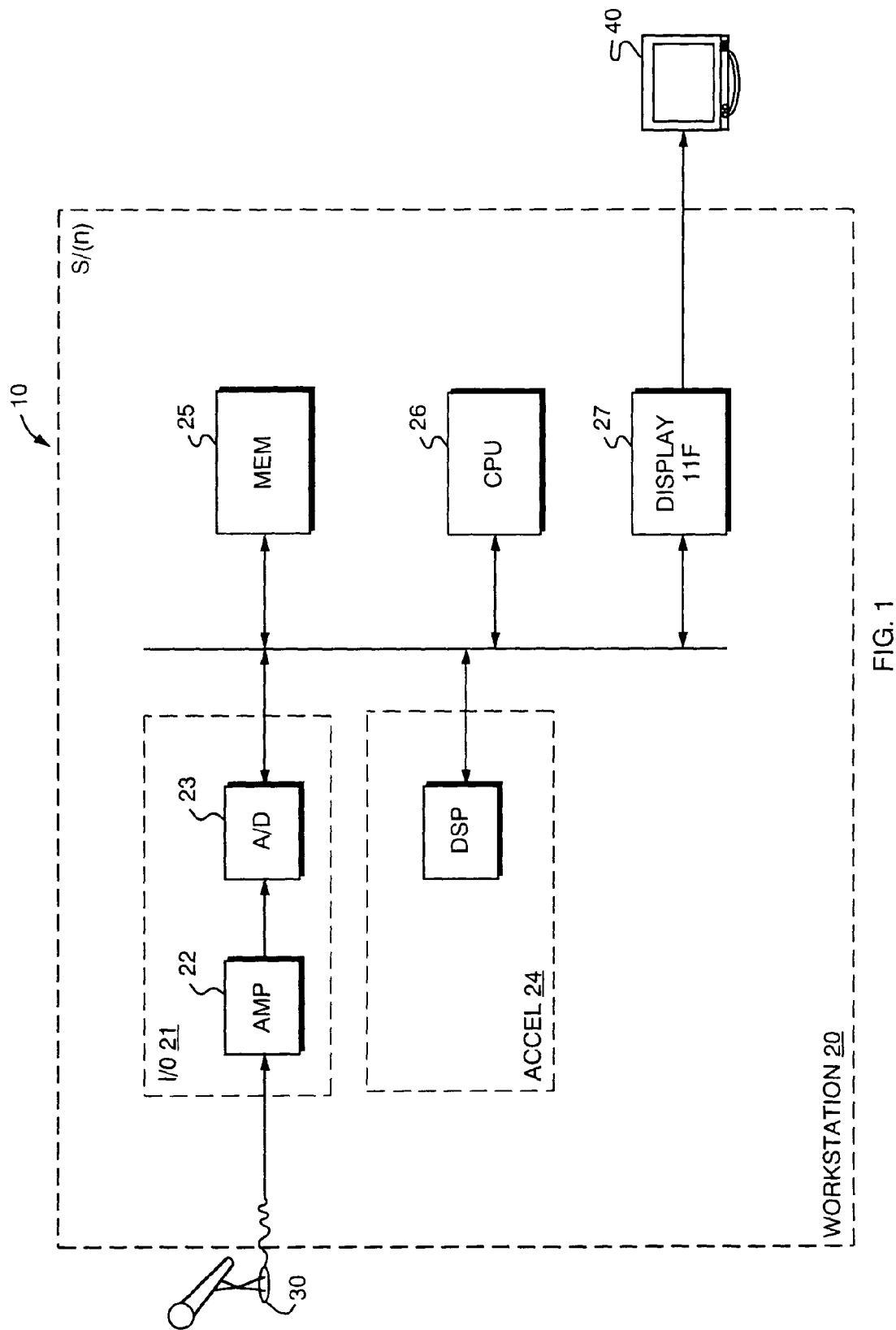
FIG. 1 is a block diagram of the components of a data processing system in which a technique for determining a tangent space and filtering data onto a manifold may be implemented.

Turning attention now to the drawings more particularly, a preferred embodiment of one particular application of the invention to characterization of laryngeal dynamics will be described in greater detail. The system 10 consists of a computer workstation 20, a microphone 30, and display 40. The workstation 20 includes components typical of a data processing system of the personal computer type, including a digital signal input/output card 21 consisting of a signal amplifier 22 and analog-to-digital converter 23, a processor accelerator board, such as one including a digital signal processor (DSP) 24, memory 25, a central processing unit (CPU) 26, and display interface 27.

In operation, speech signals are first picked up by the microphone 30 and fed to the amplifier 22 and analog-to-digital converter 23. A time sequence of the signal samples from the converter 23 is then stored as an array, S(n), in the memory 25, where n is a predetermined number of signal samples. The central processing unit 26 then processes the samples, S(n), either with its own internal arithmetic units or in cooperation with the digital signal processor 24.

This particular end use is illustrated herein by way of example. It should be understood that the invention can be applied to other applications in which characterization of a non-linear dynamical system is desired.

2. Overview of the Process

Figure 2:
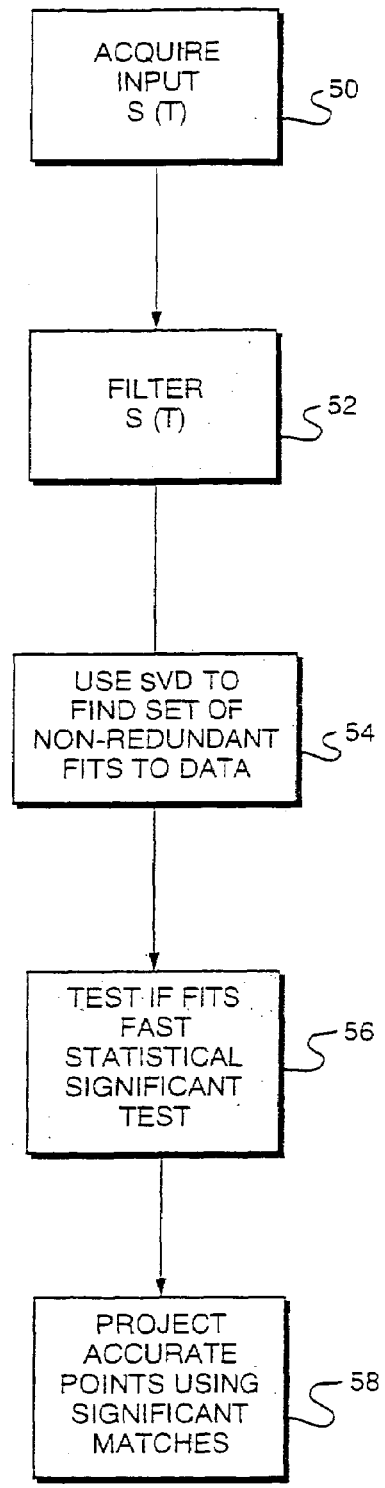
FIG. 2 is a flow diagram of a sequence of process steps which implement the technique.

In general, the present technique attempts to fit one or more constraints to the data, which are assumed not to fit any predefined function perfectly. As shown in FIG. 2, the data are acquired in a first step 50 and then filtered in a next step 52. In step 54, a matrix decomposition technique such as Singular Value Decomposition (SVD) is then used to identify a set of non-redundant fits to the data, preferably single-constraint fits, all centered about a convenient "base" point. Next, in step 56, a tangent space is defined by determining if each fit passes a statistical significance test. Fits which do pass the statistical significance test serve collectively to define the manifold near the base point. They may be used to project additional data points in the neighborhood of the base point, effecting a filtering of the additional points onto the manifold, in step 58. In steps 56 and 58, the idea is to find the intrinsic dimensionality of the data S(n) and the local tangent space at a specified base point.

A detailed program listing of one implementation of the process is included in the attached Appendix.

3. Introduction to Detailed Process Description

I. Finding Single-Constraint Manifolds Through the Data

Construction of the Design Matrix

As mentioned above, a first step is to find a base point and N other data points in the neighborhood of the base point. Next, an N-by-N square matrix is constructed by evaluating N linearly independent basis functions for each of the N points found.

For example, if 6 points are found in the neighborhood of a base point in a two-dimensional (xy) space, then 6 basis functions can be evaluated for each point found. These basis functions could be chosen to be all of the two-dimensional polynomials up through order 2, i.e., 1 (constant);

x, y (linear terms); and $x^2$, xy, $y^2$ (quadratic terms).

If 10 points are found, the basis functions could be chosen to be all of the two-dimensional polynomials up through order 3, i.e., what we have already found through order 2, plus the four new functions:

$x^3$, $x^2y$, $xy^2$, $y^3$ (cubic terms).

The basis functions can be, but need not be, polynomials.

In general, the N-by-N square matrix (called the "design matrix") is of the form $f_1(P_1)\ f_2(P_1)\ \ldots\ f_N(P_1)$
$f_1(P_2)\ f_2(P_2)\ f_N(P_2)$
...
$f_1(P_N)\ f_2(P_N)\ \ldots\ f_N(P_N)$ where $f_1(\ )\ \ldots\ f_N(\ )$ are the N basis functions chosen and $P_1$, $P_2$, ..., $P_N$ are the N points found in the given neighborhood.

For 6 points found and basis functions of 1, x, y, $x^2$, xy, and $y^2$ we would have the design matrix $1\ x_1\ y_1\ x_1^2\ x_1y_1\ y_1^2$
$1\ x_2\ y_2\ x_2^2\ x_2y_2\ y_2^2$
$1\ x_3\ y_3\ x_3^2\ x_3y_3\ y_3^2$
...
$1\ X_6\ y^6\ x_6^2\ x_6y_6\ y_6^2$.

where $(x_1,y_1)$ is $P_1$, $(x_2,y_2)$ is $P_2$, ....

Decomposition of the Design Matrix to Identify Constraint Equations

Having constructed an N-by-N design matrix, we now use standard matrix decomposition techniques, such as singular value decomposition ("SVD") or eigenvalue decomposition, to identify linear combinations of the basis functions that combine to yield something that is essentially 0 when evaluated at each of the N points found. (SVD is performed directly on the design matrix D, whereas eigenvalue decomposition is performed on $D^TD$. "Essentially 0" is specified more precisely below.)

Symbolically, we say that we want to find vectors of coefficients of the form $C=(C_1, C_2, \ldots, C_N)$, such that $f(P^j)\equiv\sum_{i=1}^{N} C_i f_i(P_j)\approx 0$ for the N points $P_j$ (j=1 ... N) found in the neighborhood.

If we find an equation of the form $f(Pj)\equiv\sum_{i=1}^{N} Ci\ fi(Pj)\approx 0$ $\forall j$ we say that this represents a constraint equation relating the data.

For example, if we have 6 xy data points lying on a circle of radius 1 and satisfying the equation $x^2+y^2=1$, we can write this as the constraint equation $$f(x, y) = -1 + x^2 + y^2 = 0 \Rightarrow$$

$$-1 + 0*x + 0*y + 1*x^2 + 0*xy + 1*y^2 = 0 \Rightarrow$$

$$(1, x, y, x^2, xy, y^2) \cdot (-1, 0, 0, 1, 0, 1)^T = 0,$$

in matrix form.

Here we have found a vector of coefficients $C=(-1, 0, 0, 1, 0, 1)$, with $C_1=-1$, $C_2=0$, ....

Vectors of coefficients ("singular/eigen-vectors" [which are actually unit vectors, unlike the example above]) corresponding to constraint equations are found by first identifying associated singular values or eigenvalues that are essentially 0. These could be identified in various ways (e.g., by Monte Carlo or symbolically); the following "input/output" analysis is particularly efficient and straightforward.

Input/Output Sensitivity Analysis for Constraint Equations

In general, singular (or eigen-) values will not be exactly 0, but if they are relatively small compared to the uncertainties in their values, then they can be considered to be effectively 0.

The uncertainties in the singular/eigen-values are determined by perturbing the data points $P_j$ by small amounts consistent with the stated level of noise on the data and by then seeing how this affects the singular/eigen-values found for the design matrix constructed from the perturbed points. For example, if the perturbation is done on an individual point-by-point and component-by-component basis (a Monte-Carlo approach involving simultaneous perturbation of all of the points is another possibility), then we can first add the stated level of noise σ to the first component of $P_1$, so that $$f_1(P_1) \; f_2(P_1) \ldots f_N(P_1)$$

in the first row of the matrix is replaced by $$f_1(P_1 + \hat{x}\sigma) \; f_2(P_1 + \hat{x}\sigma) \ldots f_N(P_1 + \hat{x}\sigma).$$

Then, new singular/eigen-values are calculated for the new design matrix, and these are compared with the corresponding values for the original design matrix to determine the effect on these values of a specified perturbation of the first component of the first point $P_1$.

This procedure is repeated for a perturbation of the second component of $P_1$, a perturbation of the first component of $P_2$, and so on. Finally, after the effects of all of these individual perturbations have been determined in isolation, the overall uncertainty in the singular/eigen-values (specifically, the covariance matrix of the variations) is determined in a statistically appropriate manner.

Additional Screening to Compensate for Chance Occurrences of Apparent Constraints on the Data Before qualifying singular/eigen-values as being essentially 0 relative to their associated uncertainties, a final statistical screening has to be applied to compensate for the fact that chance alone will result in a certain number of values being small, with this number increasing as the number of data points in the problem, i.e., value of N, increases. Only after comparing the observed ratios of singular/eigen-values to their associated uncertainties with a theoretical distribution of values corresponding to the same noise and number of degrees of freedom, is it possible to say that observed values are really effectively 0. Given the number of coordinates and points in even the most trivial nonlinear problem (2 coordinates, 6 points), it is reasonable to approximate the effect of virtually any plausible distribution of measurement errors as producing a Gaussian distribution of eigenvalue errors, and a Chi-squared distribution of their squares (which are used to compute the singular values). Thus, very standard statistical significance tests may be used to decide whether a given singular value with its uncertainty (as determined above) can be identified as "effectively zero".

II. Using Single-Constraint Manifolds to Construct the Lowest-Dimensional Manifold Containing The Data Relation Between Singular Value Magnitudes/Uncertainties and Constraint Equations Before discussing the final details of the algorithm, we state some important preliminaries.

If eigenvalues and singular values are sorted similarly (in decreasing order, for example), then their associated eigen-/singular vectors are identical to within a + or − sign that is essentially irrelevant. For this reason, it is sufficient to consider singular vectors only in the following analysis.

When multiplying a matrix times any of the singular vectors obtained from the singular value decomposition of the matrix, the result is a vector whose length is the singular value corresponding to the singular vector in question. Each component of the resulting vector is the product of the corresponding row of the original matrix times the singular vector in question.

Accordingly, if a singular value from the decomposition of our design matrix (discussed earlier) is 0, the product of every row of the design matrix times the singular vector in question must be 0, and the singular vector in this case is like the vector C mentioned earlier (with components ($C_1$, $C_2$, ..., $C_N$)), where $\Sigma_{i=1}^{N} C_i \; f_i(P_j)=0$ for all points $P_j$ (j= 1 ... N) used to construct the design matrix. In this case, we say that the singular vector in question corresponds to a constraint equation $f(P_j)=0$ relating the data.

When a singular value is not 0 but the data from which the design matrix was constructed are noisy and therefore imprecise, it is still theoretically possible for the associated singular vector to correspond to a constraint equation for the theoretical noise-free underlying data. However, as singular values become increasingly large relative to their associated uncertainties (i.e., to their associated standard deviations), it becomes increasingly unlikely that the singular vector in question really does correspond to a constraint equation.

Correspondence Between Constraint Equations and Associated Manifold Geometry

Constraint equations have geometrical interpretations here, and the set of all points satisfying a given constraint equation form a manifold (curve, surface, ... ). For example, for three-coordinate (xyz) data, a constraint equation of the form ax+by+cz+d=0 represents a plane, which is a two-dimensional manifold (surface), and an equation of the form $(y-a)^2+(z-b)^2=0$ represents a line, which is a one-dimensional manifold (curve). The plane here corresponds to a single-constraint manifold: It is not possible to move from one point in the plane to an adjacent point in the plane by proceeding in the direction (a,b,c), which is normal to the plane. The line corresponds to a double-constraint manifold: y=a and z=b. Both y and z are constrained to particular values here.

For a single-constraint manifold, it is possible to determine the constrained direction for any point on the manifold by taking the gradient of the constraint function f(P). (For more details, please see the discussion in the "Why Single-Constraint Manifolds?" section here.) For example, the gradient ($\partial/\partial x$, $\partial/\partial y$, $\partial/\partial z$) applied to the function ax+by+cz+d does yield the correct constrained direction (a,b,c).

Constrained directions are described as being in the null space of [the tangent space of] a manifold, while allowed directions are in the range of a manifold. For the line example above, the y- and z-directions are in the null space, while the x-direction is in the range of the line.

Final Details of the Algorithm

Now returning to a description of the process, tor each of the N singular vectors obtained from the decomposition of our design matrix, we then determine the gradient $\nabla f(P)$ (where f(P) is $\Sigma_{i=1}^{N} C_i f_i(P)$, from before) at a specified base point $P=P_{base}$.

If associated singular values were essentially 0, as determined by the analysis outlined above, we set these values exactly to 0. Larger singular values are not changed.

We then multiply each of the N gradients $\text{grad}_j$ (j= 1 ... N) found above by a probability factor (for example, $\exp(-\text{sval}_j^2/(2 \; \Delta\text{sval}_j^2))$, where $\text{sval}_j$ is the [possibly adjusted] jth singular value and $\Delta\text{sval}_j$ is the uncertainty [standard deviation] associated with $\text{sval}_j$). Multiplying by this factor has the effect of greatly suppressing the contributions from possible solutions that are statistically unlikely.

We now simultaneously consider the N [probability-weighted] gradients just obtained. For a d-dimensional coordinate space, the gradients are d-dimensional vectors, so that an N-by-d matrix can be formed from the N probability-weighted gradients. We now perform a singular value (or eigenvalue) decomposition on this N-by-d matrix, and this yields d singular values.

The values that are clearly non-zero correspond to singular vectors that span the space spanned by the weighted gradients. I.e., these singular vectors span the null space of the data set (at the base point), and the number of these vectors is the dimension of the null space, which is equal to the number of constraints on the data set.

The other singular vectors correspond to singular values that are essentially 0. ("Essentially zero" is determined by a two-step "input/output" analysis, i.e., perturbed data points $P_j \rightarrow$ vector uncertainties in weighted gradients $\rightarrow$ uncertainties in singular values obtained from decomposition of N-by-d weighted gradient matrix. This is followed by a statistical screening to compensate for the value of N, i.e., the risk of "false alarms", as outlined earlier). These essentially-0-valued singular values correspond to singular vectors that are orthogonal to the null space of the manifold, so these singular vectors represent the tangent space description of the manifold.

EXAMPLES

We conclude this section with some simple examples in three-coordinate (xyz) space.

A line might be found as the intersection of two distinct planes. Each plane would correspond to a single distinct constraint, and the line would represent a (one-dimensional) manifold with two distinct constraints.

Data degenerating to a single point might be described as the intersection of three distinct planes, each corresponding to a distinct constraint. The point would then represent a (zero-dimensional) manifold with three distinct constraints.

Points from a circle with $x^2+y^2=1$ and $z=0$ might be found as the intersection of the cylindrical surface with $x^2+y^2=1$, z=anything, and the x-y plane with z=0. Each surface here would correspond to a single-constraint manifold, and the circle would represent a (one-dimensional) manifold with two distinct constraints.

Additional surfaces might also be found passing through the points from the circle above (e.g., spherical or conical surfaces). For all of these extra surfaces, however, the normal (constraint) information would be found to be redundant with the constraint information already obtained from the plane and cylindrical surface above. Specifically, the normal to any one of these extra surfaces would be seen to be a linear combination of the plane and cylinder normals already found, and so the final determination of the intrinsic dimensionality and tangent space of the data would be unaffected.

Why Single-Constraint Manifolds?

In a three-dimensional xyz space, consider the line in the x-direction with y=2 and z=3. Think of this line as the intersection of two planes described respectively by the constraint equations $f_1$ and $f_2$ below, where $f_1$ describes the single constraint y=2 and $f_2$ describes the single constraint z=3.

$$f_1(x,y,z)=0*x+1*y+0*z-2=0$$

$$f_2(x,y,z)=0*x+0*y+*z-3=0$$

$\nabla f_1=(\partial/\partial x, \partial/\partial y, \partial/\partial z) f_1=(0, 1, 0)$, i.e., the normal to the first plane.

$\nabla f_2=(\partial/\partial x, \partial/\partial y, \partial/\partial z) f_2=(0, 0, 1)$, the normal to the second plane.

The two normals are distinct and span a 2-dimensional space that is orthogonal to the line. We say that the dimension of the orthogonal space (nullspace) is two here, so that the dimension of the (lowest-dimensional) manifold containing the points on the line is embedding dimension − nullspace dimension =

= total # of coordinates − nullspace dimension =

= 3 − 2 = 1, which is correct for a line. √

If we tried to simultaneously incorporate the two constraints into a single equation, we would get something representing a less-than-D-1-dimensional manifold. For example, to simultaneously require y=2 and z=3, we would need an equation of the form $$(y-2)^2+(z-3)^2=0$$

or $$(y-2)^2+(z-3)^4=0$$

or

. . .

If we tried (y−2)+(z−3)=0, we would really have y+z−5=0, which is not the equation for a line but is the equation for a plane.

Looking at the original $f(x,y,z)=(y-2)2+(z-3)2=0$, we see that $\nabla f=(\partial/\partial x, \partial/\partial y, \partial/\partial z) f=(0,2(y-2),2(z-3))$ However, since y=2 and z=3 everywhere along the line, we have $\nabla f=(0,0,0)$ everywhere along the line, and this represents an unrestrictive gradient.

The equation $(y-2)2+(z-3)^2=0$ represents the equation for a D-2-dimensional manifold here (two independent constraints), but from a gradient analysis point of view, the equation here is not very useful.

4. Detailed Description of the Tangent Space Determination and Fitting Process

Now to describe the process more particularly, given a "base" point at (without loss of generality) $0 \in \Re^d$ (for a d-dimensional embedding, $2 \leq d \leq 10$, perhaps, where $\Re$ represents the Real numbers), we ask if a discrete set of points $S=\{X_j\}_j$ in its neighborhood are (apparently) confined to some lower-dimensional manifold, and, if so, what their tangent space is at this base point is.

In the context of analyzing nonlinear dynamical systems, we do this for two reasons. First, we wish to ensure that meaningless, noise-dominated "dimensions" are associated with Lyapunov exponents that are identified and suppressed (to leave only meaningful exponents). Second, it is important that meaningful principal axes near the base point of each neighborhood's computation not be mixed (by linear combinations) with meaningless axes when the displacements happen to evolve with similar exponents. (In this case, the basis could mix such axes freely, because the parts of the basis describing dynamics with equal exponents is a completely arbitrary basis of the subspace—an arbitrary linear combination of the "true" basis vectors, i.e., those tracking the actual dynamics, and those identifying noise.)

This application, analyzing a (possibly fractal) attractor of a nonlinear dynamical system, is the primary focus of the invention. In places, it will therefore be convenient to be aggressive in identifying or inferring tangent-space directions, conservative for their orthogonal complement (the constrained, i.e., "null-space", directions). That is, directions for which the evidence is ambiguous (because of the placement or uncertainty of available data) may be preferentially identified as part of the "tangent space" instead of the "null space". This can be desirable because inferring a null-space direction is equivalent to concluding that the data satisfy a constraint—a strong assertion.

A secondary consideration comes from determining the full equation for a tangent space. Under certain common circumstances, the additive constant or offset of the tangent space from a given data point provides an estimate of the error in the data point itself (at least in the null-space directions). Subtracting this estimate corresponds to filtering the point onto the manifold.

Throughout, one must be careful in distinguishing between "absence of evidence" and "evidence of absence." In some parts of the following mathematical analysis, the first of these will be helpful; in others, the second.

Formal Solution: Noise-Free Data

The practical solution proceeds in stages, starting from that for a large, if still finite, number of noise-free data. In this ideal case as mentioned above, the solution has two steps:

(1) From some large class of "reasonable" choices (a Hilbert space), determine all solutions of a certain constraint equation consistent with the given data; and
(2) from the set of all such solutions, extract the linearly independent descriptions (coefficient vectors) of the tangent space.

The former may be effected by conventional curve-fitting, as by least-squares (e.g., through the singular-value decomposition algorithm, "SVD"); however, the requirement of finding "all" solutions means that this problem—unlike the conventional one—is not overdetermined. The latter requires finding a basis for the null space among all of the solutions—for which SVD will also prove convenient. (The tangent space consists merely of all vectors orthogonal to this null space.) We begin by considering "reasonable" constraint equations. First, check if all neighborhood data fit (practically) any continuous functional form, even implicitly, in terms of a (row-)vector-valued function $f$. The function must be a sum of n linearly independent basis functions $\langle f_j \rangle_j$ (i.e., principal components of a function-space linear representation):

$$f(x_i, y_i, z_i) a = a_0 + a_1 f_1(x_i) + a_2 f_2(y_i) + a_3 f_3(z_i) + \ldots = 0,$$

an equation which is linear in the row-vector $a^T = \langle a_j \rangle_j$, where (for notational convenience) we take the embedding dimension $d=3$, and the neighborhood data then to be $\{X_i = \langle x_i, y_i, z_i \rangle\}_i$, a set of precisely n elements (row-vectors). Thus, for a given $f$ a is a transform of the data, albeit one that is nonlinear in the data. In this case, if 0 (the base point) is itself one of the data, we must have $a_0 = 0$. It is convenient to index the basis functions $f_j$ beginning with $j=0$. Without loss of generality ("WLOG"), then, adopt basis functions such that $$f_j(0) = \delta_{j,0} \text{ (for all } j \geq 0\text{)—the Kronecker delta;}$$

$$\nabla f_j(0) = \delta_{j,k} \text{ (all } j; \text{ each k in 1} \ldots d\text{); and}$$

$$\nabla f_j(0) = 0 (j > d+1).$$

For example, $$a_0 + a_1 x + a_2 y + a_3 z + a_4 x + a_5 xy + a_6 (\cos z - 1) + a_7 (\sin xz - xz) = 0$$

where each basis function $f_j$ is the expression that has been multiplied by $a_j$.

We choose to filter the data to determine if there is a lower-dimensional manifold, using principal components analysis (PCA), or, equivalently, singular-value decomposition (SVD). To wit: We try to find $a = \langle a_j \rangle_j$, a set of n coefficients, not all zero, such that $$F(S) [a_0 \; a_1 \; \ldots \; a_n]^T = 0, \text{ for}$$

$$F(S) = [1 \; 0 \; 0 \; \ldots \; 0; \; 1 \, f_1(x_1) \, f_2(y_1) \, f_3(z_1) \ldots ; \ldots ; 1 \, f_1(x_n) \, f_2(y_n) \, f_3(z_n) \ldots ],$$

where ";" separates the rows—i.e., $$F(S) = \begin{bmatrix} 1 & 0 & 0 & \cdots & 0; \\ 1 & f_1(x_1) & f_2(y_1) & f_3(z_1) & \cdots; \\ \vdots & \vdots & \vdots & \vdots & \vdots; \\ 1 & f_1(x_n) & f_2(y_n) & f_3(z_n) & \cdots \end{bmatrix},$$

the design matrix of the linear fit. WLOG, we take $|a|=1$.

At this point (we write F for F(S) when convenient, and F(.) for the matrix-valued function, if necessary), we factor F using singular-value decomposition: $F = U_F W_F V_F^T$. ($W_F$ is a diagonal matrix of the singular values, which are non-negative; the columns of U form an orthonormal ["o.n."] basis of the function space and constitute the principal components of F; the columns of V are the singular vectors of F, also an o.n. basis of the coefficient space, in this case.) Then we form some pseudo-inverse $W_F^\dagger$ (diagonal) for $W_F$, such that:

$$(W_F)_{kk} = 0 \Rightarrow W_F^\dagger{}_{kk} = 0, \text{ and}$$

$$(W_F)_{kk} \gg \text{"noise" on the data} \Rightarrow W_F^\dagger{}_{kk} (W_F)_{kk} = 1.$$

(Note that for any definition of the pseudo-inverse "†", the "effective" rank of W can be defined as the trace of $W^\dagger W$, which is often more meaningful than a mere count of the number of its non-zero eigenvalues.)

Thus, we seek any non-zero vector(s) $a \in NS(F)$, the null space of F. Since this means $Fa=0$, or $U_F W_F V_F^T a = 0$, and since $U_F$ is an orthonormal basis (recall that F is square), we must have $$a \in NS(W_F V_F^T).$$

The vector a therefore consists of a (any) linear combination of the columns of $V_F$ that correspond to singular values equal to zero in $W_F$. The number of linearly independent solutions for a is the number of such columns of $V_F$, precisely the number of null singular values in $W_F$—which, in turn, is just the co-rank of F, n—rank(F).

Adopting (for now) the Moore-Penrose pseudo-inverse for "†", we have that $W_F^\dagger W_F$ is a diagonal matrix of zeroes (for NS(F)) and ones. (Conventionally, SVD algorithms order the singular values in $W_F$ in decreasing order., so diag($W_F^\dagger W_F$) consists of all the ones, then all the zeros; we shall assume such an algorithm here, whenever convenient for exposition.) Then $(I - W_F^{554} W_F) V_F$ consists of precisely an o.n. basis of NS(F), prefixed with some null vectors (as many as the number of non-zero singular values of F, i.e., its rank).

Notice that the first row of $V_F$ "matches" the constant function $f_0$. (That is, the constant part of f(.) is given by $U_F W_F$ times the transpose of this row.) Likewise, the next d rows of $V_F$ match the linear basis functions—whose coefficients in a are precisely the derivatives at the origin of f(.)a, the functional fit specified by a. Now we extract the first-derivative columns of $(I - W_F^{554} W_F) V$ into a matrix A, and observe that A consists of length-d column vectors, the first rank(F) of which are zero.

Distinct nonlinear fits may have identical or linearly dependent solutions for the linear coefficients (although not, of course, for a, the complete vector of coefficients). That is, rank(F) may be as large as n, but rank(A) cannot possibly exceed the number of its rows, which is only d. Thus, linearly independent columns of A describe distinct directions (at the origin) in which the manifold does not extend: the orthogonal complement of the tangent directions.

Now we use SVD again, to find those linearly independent columns of A. This determines the rank and the linear equations for the tangent space (notice that the rank may equal d, if the data really extend in all directions around the base, even after fitting to the nonlinear functions—but we will still call the result a "tangent" space, albeit a trivial one, consisting only of {0})):

$$A = UWV^T,$$

$$\text{rank}(A) = \text{rank}(W).$$

The diagonal elements of W in each of A's principal directions inversely determine whether the data "really" extend in the direction: Large diagonal elements correspond to directions that do annihilate—are orthogonal to—the (linear approximation to the) data. And the principal directions are precisely the columns of U. (Infinitesimal displacements from the origin are d-dimensional vectors, so notice that they must pre-multiply A, because A is d×n.)

We are thus led to form the projection for the tangent space:

$$P = I_d - AA^\dagger = I_d - UWW^\dagger U^T = U(I_d - WW^\dagger)U^T,$$

which clearly has the required form for a projection: apart from a rotational similarity (i.e., U), it is diagonal with eigenvalues of zero and unity (or approximations thereto, depending on the definition of "†"); moreover, it preserves the vectors that A annihilates (i.e., the tangent space), and vice versa. This therefore has just the proper behavior, suppressing directions whose data-extents are small compared to the "noise", but leaving unaltered those that are well determined (extent much larger than the "noise").

For some purposes, this "projection" may be replaced with some other, qualitatively similar, matrix, such as $U\cos(-\pi WW^\dagger/2)U^T$. Most of the discussion below is unaffected by such a replacement.

It is convenient to be able to enforce dimensionality constraints in certain cases. For example, a certain direction may be known to lie in the tangent space, yet some data sets may favor inferring (erroneously) that it lies instead in the null space. There are several methods by which this prior information may be enforced. However, it will be important to use a method that applies appropriately to "noisy" data sets or even to (slightly) uncertain prior information, not only to logically certain cases. Accordingly, this topic will be deferred until we consider the problem of noisy data (below).

If the prior information concerns a null-space direction, on the other hand, it is trivial to form the projection matrix that annihilates this direction, and to multiply P by it.

Solution for Noisy Data

Suppose now that the $X_j$ vectors (or "points") contain additive, zero-mean, random noise of some distribution not yet specified. We revisit the formal (noise-free) solution, after normalizing the data set. Specifically, scale the set by the factor $$\phi = \max_k \{|X_k|\}, \quad X_j \leftarrow X_j/\phi,$$

which produces a normalized data set whose largest-magnitude element has a squared norm equal to unity. For some scalar standard deviation σ>0, let the scaled (noisy) elements have Gaussian noise ~N[0,σ²] (say), independent across points (and independent equal-variance across components, as the notation indicates). We assume σ<<1.

Now we perturb every datum by approximately σ in every component, recompute A (or at least W) for every such perturbation, and note whether any imperfect fits, corresponding to initially non-zero singular values, can become perfect (zero). If so, then these additional fits are included, although discounted, according to the magnitude of perturbations (relative to σ) needed to produce them.

The Offset: Filtering the Base Point onto the Manifold

In principle, we could adjust all of the noisy points to minimize the sum of squared residuals (or some other convenient functional). The above development provides initial coefficients to achieve such a fit, but iteration would no doubt be needed. This would occur in the space of all coefficients jointly with all points' errors. Since the latter part alone is a space of nd dimensions, and the functional depends nonlinearly on the errors, the task would be computationally expensive. Even a single iteration could (depending on the iteration algorithm) involve numerically differentiating all of the n basis functions with respect to all of the nd scalar errors.

There is an important—and inexpensive—special case: the base point, if it is one of the data points. We can then content ourselves with estimating only the base point's error. As mentioned earlier, this is related to the offset of the tangent space from the origin: Like any linear function, the tangent space is described by a "slope" in each dimension (the direction vectors) and an intercept—the offset. Estimating this offset, and applying it to the base point is conceptually trivial—and, for the chosen basis functions, it is even computationally trivial.

Typically, we will translate the data to a neighborhood of the origin by subtracting one datum from all of the others. However, there is one important refinement. Although the offset's estimate is nominally accurate to second order, the base-point's error is the one error that appears in every other neighborhood point's error—simply because (in the common case) the base-point's position is subtracted from every other point in order to translate the base to the coordinate origin. As a result, it may be beneficial to subtract this estimate from the base point and repeat the translation-and-fit operation. Observe that this, unlike the general best-fit problem, is a low-dimensional iteration of inexpensive computations. The errors to be estimated constitute a d-dimensional space, and the functions are numerically evaluated once per iteration, rather than an nd-dimensional space with d+1 or more evaluations per iteration.

Enforcing Dimensionality Constraints

It may happen that we have prior information (of some significant, even perfect, certainty) that the tangent space or the null space includes a particular vector or set of vectors: a known subspace. For example, if the data are sampled from a dynamical flow, then the tangent space at the base point must include the local velocity vector—even if the data are sampled so coarsely that the above algorithm cannot initially reproduce this result. It is useful to extend the algorithm to combine this prior information with the "initial" results; for example, that the tangent space should include some vector that is approximately equal to an imperfectly estimated (or even perfectly known) local velocity vector.

There is a mechanism that generalizes easily to the case of uncertain prior information. Suppose, for example, that the prior-information directions $\{p_j\}_j$ consist of null-space vectors (i.e., constraint directions) only. Then one can construct the "augmented" null-space basis matrix $$B'=[v_1, v_2, \ldots, p_1, p_2, \ldots],$$

where the $v_i$ are the null-space vectors inferred by the above procedure. Next extract an o.n. basis from this matrix; construct the corresponding basis matrix (by making each column one of the basis vectors); and multiply by its transpose to construct the null-space projection map (with or without considering base-point noise). Finally, construct the tangent-space map by subtraction from the identity matrix.

The solution for the case of prior information about tangent-space directions is virtually identical, relying instead on augmenting the initial tangent-space basis matrix.

Observe that this technique, constructing an o.n. basis from the augmented matrices, ensures that any redundant information, either among the prior directions or between them and the initial (data-determined) directions, is automatically removed. It also ensures that the magnitudes of the $\{p_j\}_j$ are ignored in constructing the revised null space: This is proper, because these vectors are only supposed to identify directions.

It remains to show how to incorporate uncertain prior information. At heart, this entails using the magnitudes of the prior-information vectors, compared to the magnitudes of the initial estimates; the latter are given by the o.n. basis vectors, each multiplied by its corresponding "certainty," which will be a weight constructed from how close to zero its corresponding singular value is.

It is important that this "certainty" reflect the statistical significance of the solution (zero, or near-zero, singular value) given the number of data and number of basis functions.

In this case, assume that each direction-vector, whether prior (p') or data-determined (u'), is scaled by its "certainty". Specifically, we set its length (i.e., norm) so that its norm multiplied by its (angular) error is just equal to a. Now form the augmented matrix B' as before, and perform SVD on the result:

$$B'=U_B W_B V_B.$$

In this case, however, we do not simply extract the principal components in UB that correspond to non-zero singular values in $W_B$. Rather, in keeping with the earlier uses of SVD when dealing with noise, we determine the singular values that are irrelevantly small, suppressing the corresponding column-vectors in $U_B$. We retain only the remaining, "substantial" vectors, those that (we can "confidently" assert) impose true constraints on the data, and thus define the null space.

As before, we form the null-space projection from the matrix consisting of a row of all these column-vectors; finally, we construct the tangent-space matrix by subtraction from the Identity matrix.

An Application

Consider the attractor of the Rössler chaotic dynamical system. This system is so strongly dissipative that the manifold (attractor) is extremely thin ($\sim 10^{-20}$ of its height and width) virtually everywhere: Although topologically a three-dimensional ("3-D") system, its Lyapunov dimension is 2.02. Therefore, most neighborhoods are much too thin to permit realistic measurement of the correct (topological) dimension. However, estimation of this system's dynamics would demand the correct dimension, since that is precisely the number of Lyapunov exponents of the system: The wrong number would be a qualitative error destroying the integrity of the dynamics.

The solution begins by noting that the topological dimension is independent of position on the attractor. Therefore, it suffices to find one neighborhood on which the three-dimensionality is reliably measured.

Notice that this is actually a generic rule: Dissipation can make any attractor appear to be lower-dimensional than it truly is, but never higher-dimensional. Proper accommodation for noise is important, however, since noise can only increase the apparent dimension over its correct value. The Rössler system (like many others), though, exhibits its chaotic dynamics over the global scale of its attractor. Consequently, even a very noisy rendition of the attractor (say, signal/noise ~5) is sufficient to show the "stretch-and-fold" nature of the dynamics, with the consequent Cantor-set structure of the attractor.

Specifically, where the attractor "folds over" and collapses onto itself, it cannot be represented as 2-D (even with high noise); but it can be represented as 3-D, if the embedding dimension (number of coordinates) is sufficiently high.

5. Examples of Fits

Figure 3:
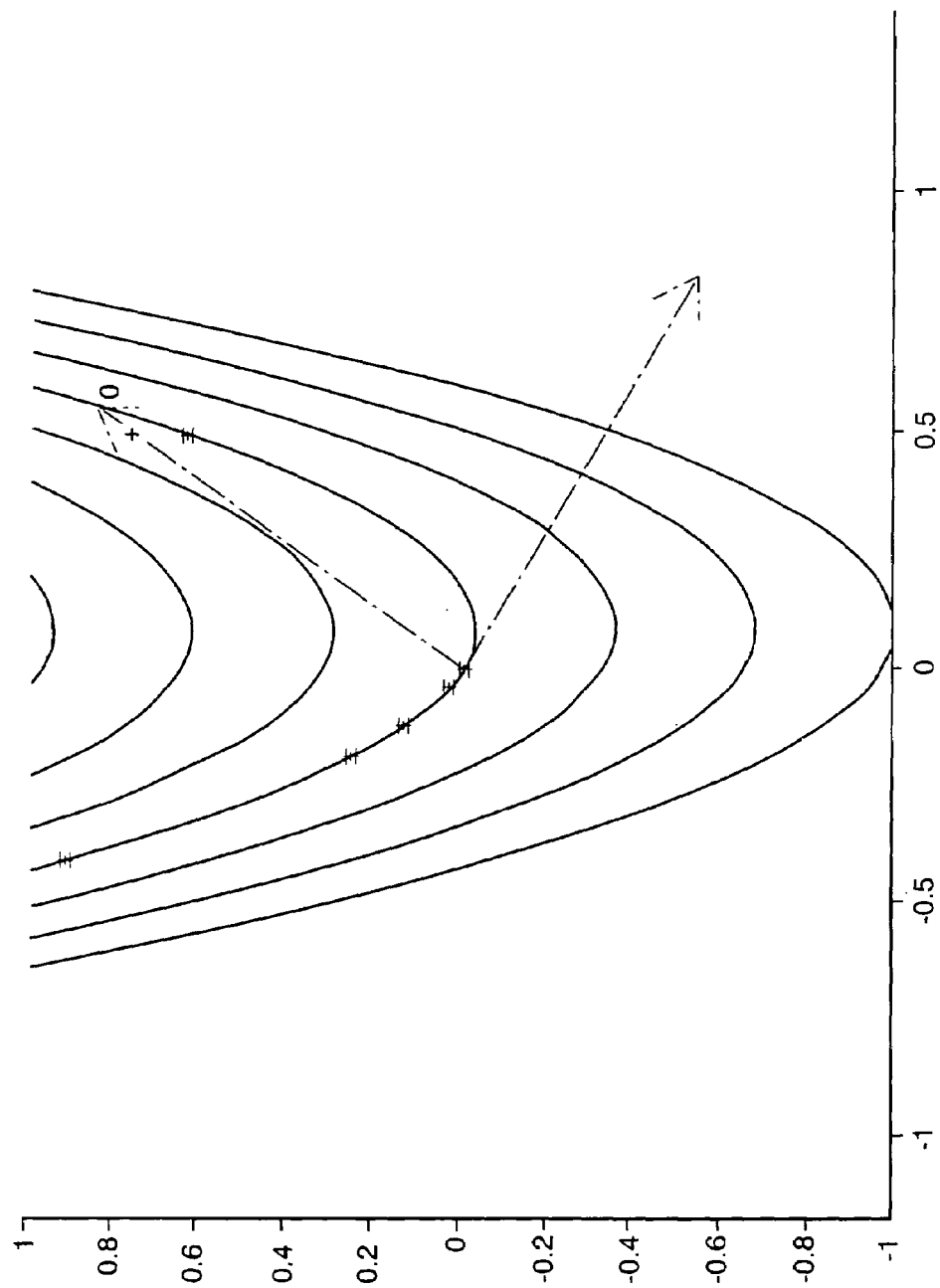
FIG. 3 is a plot showing how the technique works in the ideal case of fitting data that happen to be quadratic using second-order, or quadratic, basis functions.

FIG. 3 is an illustration of the ideal type of fit which can be made to perfect data. The data points, indicated by the "X"'s, were generated using a quadratic, i.e., second-order, function. Quadratic functions were also used as the fitting functions. The tangent space was determined at the point (0,0); the downward sloping arrow indicates the direction of the tangent line, the upward sloping arrow the direction of the null space. The notation diag (0.028, 1.000) indicates a "thickness" of the tangent space, i.e., an indicator of how scattered or extended the algorithm estimates the data to be, in the direction perpendicular (or parallel, respectively) to the tangent line. In this case, the data support high confidence that the manifold is thin (scatter estimated at 0.028 units) in one direction, the constrained one; and extends indefinitely (about 1.000 unit, approximately the full radius of the data set) in the orthogonal direction, the tangent.

Figure 4:
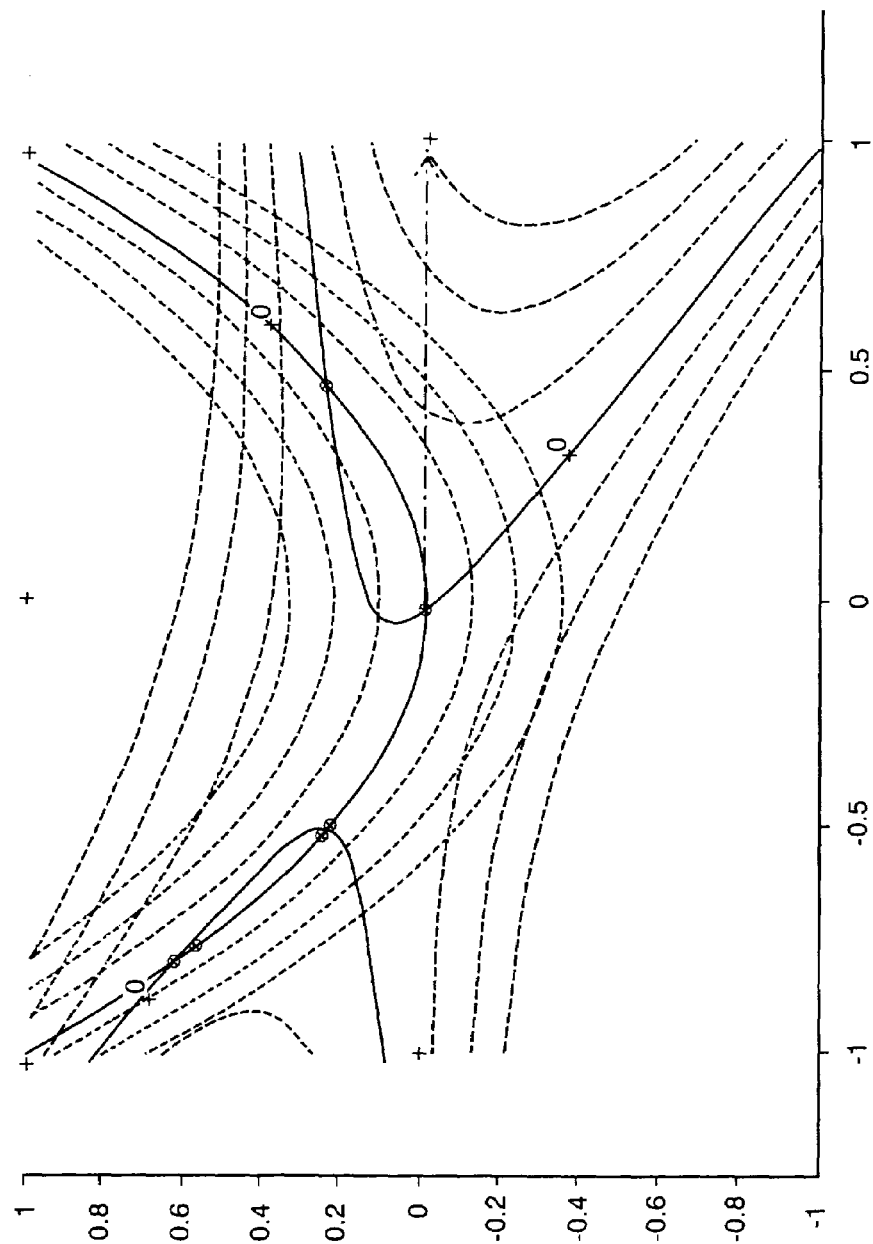
FIG. 4 is a similar plot with "clumpier" data.

FIG. 4 is a similar plot for "clumpy" data. The estimates are still robust with a relative noise level (scatter in the constrained direction) estimated to be 0.005. Even though a second "fit" is shown, it is sufficiently poor compared to the first fit that it has virtually no effect on the estimates. (The zero contour for each fit is labeled with "0" next to a "+" on the contour.) The two direction arrows have been multiplied by the estimated scatter or extent, 0.005 and 1.000, with the result that the null-space direction's arrow is invisibly small.

Figure 5:
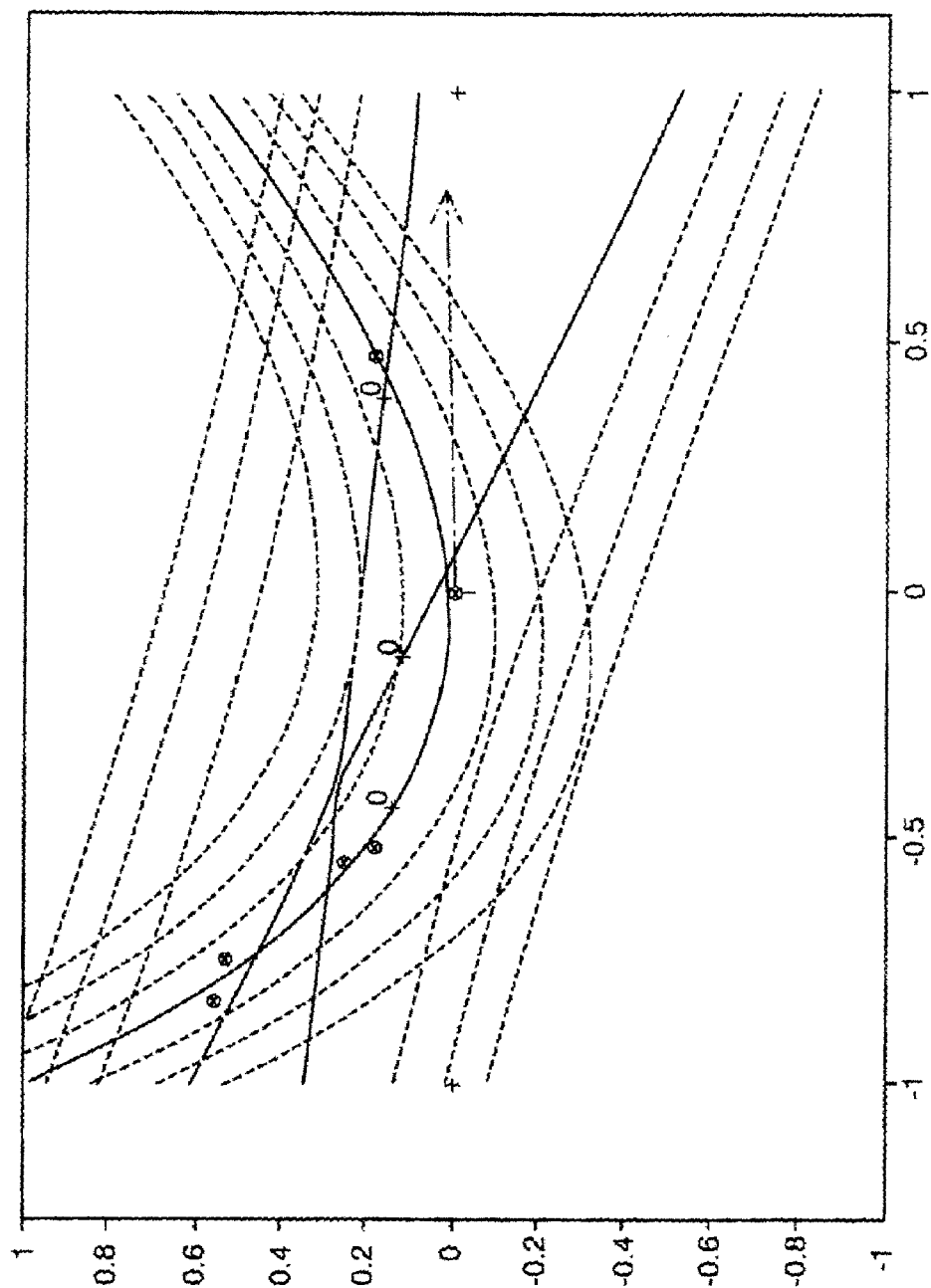
FIG. 5 shows how well the technique can be used to fit noisier data.

FIG. 5 shows how well the algorithm detects the tangent line even with much noisier data. The directions are accurately estimated. The computed scatter ("noise level") in this case is 0.04 in the true constrained direction, and the extent drops only to 0.80 (still approximately the radius of the data set) in the true tangent direction. The two arrows have again been multiplied by the estimated scatter or extent.

Figure 6:
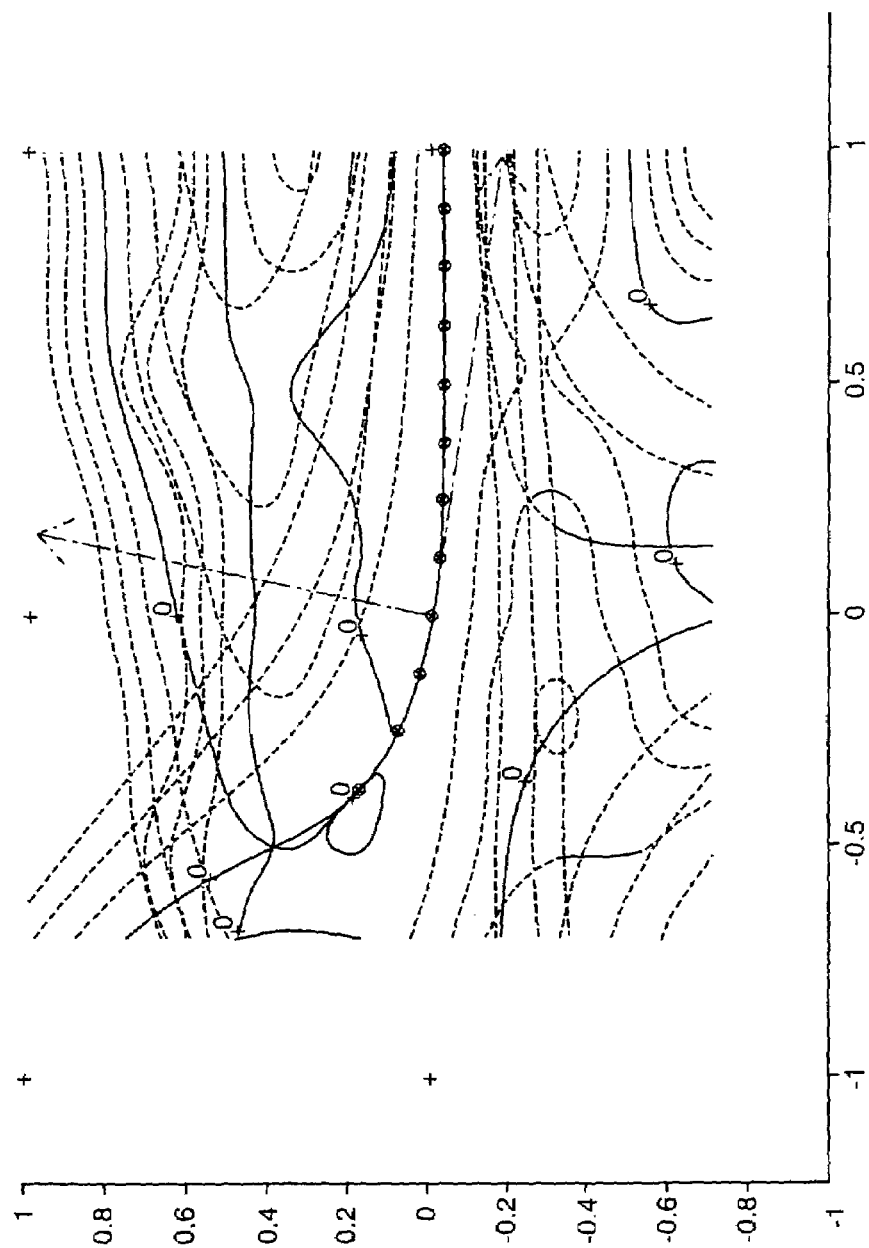
FIG. 6 is a plot showing how the technique may fit the tangent line of a fourth-order, or quartic, function using only a set of second-order, or quadratic, basis functions.

FIG. 6 shows the results of a fit to a general constraint, one which lies outside the space of the basis functions. Again, the fits that were found (three in this case, with their zero contours marked as before) produce an accurate estimate of the tangent line, even though no fit could match the true function (a quartic in this case) anywhere except on the specific 13 data points. Once again, the data are estimated to extend 1.000 unit in the tangent direction and only 0.001 unit in the orthogonal direction.

While this invention has been particularly shown and described with references to preferred embodiments thereof, it will be understood by those skilled in the art that various changes in form and details may be made therein without departing from the spirit and scope of the invention as defined by the appended claims.

APPENDIX

```
function [proj_diag,covpj,nscols,err_basis,df_eff,dz_fit]=tgt_space(DZ,ORDER,SCALEMIN2,WEPS,TGT0)
%tgt_space: Estimate (quasi-)proj'n. mtx. for tangent space of given data (and any known tgts.).
%          [proj_diag,covpj,nscols,err_basis,df_eff,dz_fit]=tgt_space(DZ,ORDER,SCALEMIN2,WEPS,TGT0)
%where:
%          proj_diag = diagonalized (quasi-)projection mtx. (symmetric) for tangent space:
%                     "DZ*nscols'*proj_diag*nscols" will project the DZ points (ROW vectors) --
%                     near-perfectly, if noise is small -- onto the tangent space (and
%                     "nscols*proj_diag*nscols'" will do the same for COLUMN vectors);
%          covpj    = cov. mtx. for diag. el'ts. of "proj_diag" (which is itself diag.);
%          nscols   = o.n. basis (symmetric) for the tangent space & its complement (note that this
%                     is the eigenvector matrix corresp. to "proj_diag");
%          err_basis = principal axes of the nonlin. fit's error ellipsoid;
%          df_eff   = "effective" (noise-filtered) # degrees of freedom of the nbd. (i.e., of its
%                     fit to "itself");
%          dz_fit   = "real" positions of the DZ elements -- i.e., differing from DZ only
%                     by "noise" (as determined by SVD for the full [poss. nonlinear] fit);
%          DZ       = column of displacement vectors (i.e., each vector = 1 row);
%          ORDER    = max. order of polynomials to be fit (by "design_poly");
%          SCALEMIN2 = norm-squared DZ "noise" level for filtering (i.e., principal components of
%                     DZ that are much smaller than this will be suppressed, larger will be retained);
%          WEPS     = norm-squared DZ precision level for filtering;
%          TGT0     = col. of KNOWN tangent (row-)vectors -- optional: if missing or [], no tgt.
%                     directions will be asumed known (enforced), and the only directions identified will
%                     arise from the data (DZ) themselves; if specified, each row-vector should have
%                     a length (norm) equal to "sigma"/its directional uncertainty (so that the POSITION
%                     of its "tip" may be considered to have an RSS uncertainty equal to "sigma" =
%                     sqrt(SCALEMIN2/embedding dimension)). See the warning in the Notes.
%
% Notes:
% 1.    Typically, WEPS is set by data-indep. precision limits (e.g., computer or A/D hardware).
%       Conversely, SCALEMIN2 is a measure of the observation "noise", and may therefore be
%       data-dependent. Both are taken to be RELATIVE measures (i.e., as a fraction of the
%       data values). In both cases, "noise" is interpreted liberally: It identifies effects
%       that are small enough that the SVD fit is INTENDED to ignore them. (Ordinarily,
```

```
%         SCALEMIN2 is the relevant limit; being data-dependent, however, it could occasionally
%         be "artificially" small due to an accident of the data set.)
% 2.      For "n" = "size(DZ,1)" data points, "n-sum(diag(proj_diag))" is approx. the dim. of the
%         NULL space of the fit -- the number of dim's. that are (near-)perfectly fit by the other
%         dim's.
% 3.      For "size(DZ)" = "[dim,n]", "n" must be AT LEAST as large as "poly_terms(ORDER,dim)".
% 4.      Each vector in DZ is a ROW, rather than the usual column. (This is why the projected
%         vectors are "DZ*nscols'*proj_diag*nscols", instead of "...*DZ".)
% 5.      Being itself a proj. matrix, "proj_diag" has eigenvalues (virtually) equal to either 0 or
%         unity (apart from a possible scale factor -- typically, the eigenvalues should be divided
%         by their max. value, if this is signif. less than unity.) Because noise tends to add to signal
%         in an RMS sense, even rather low-noise signals will be slightly reduced by applying
%         the projection; that is, the largest eigenvalue of "proj_diag" will usually be slightly < 1
%         (so the projection may be re-scaled by such a factor afterward if desired).
% 6.      The values in "proj_diag" will be in NO guaranteed order, although the first values will
%         TEND to span the null space, the last ones the tangent space.
% 7.      TGT0 is especially useful in a dynamical FLOW, where the along-orbit direction is
%         guaranteed to lie in the tgt. space. (In a dyn. map, by constrast, successive points need
%         not have any particular relationship in local geometry.) Warning: Unrealistically "certain"
%         row-vectors in TGT0 (i.e., ones with very large norms) may produce justifiably severe anomalies;
%         norms larger than 1/WEPS are almost always unrealistic, but this is NOT DETECTED IN ANY WAY in
%         this routine.
%
%See also: design_funcs, poly_terms.

% Fraction of nominal RMS errors by which to perturb coeff's. (to eval. "covpj"):
% Choose a rather small value, because (being based on sing. VALUES, which are always >= 0) the
% larger perturbations might cause a sing. VECTOR to change sign as a sing. value was reduced to
% zero and then increased (resulting in a misleadingly small est. of the range of pert's. of the
% sing. value). (Analogy: To vary "abs(x)" by +-unity about the value 1/2, do NOT compute
%         variance_estimate = ((abs(X-1)-abs(X))^2 + (abs(X+1)-abs(X))^2) / 2 = 1/2;
% instead, compute (e.g.)
%         variance_estimate = ((abs(X-0.1)-abs(X))^2 + (abs(X+0.1)-abs(X))^2) /2 * 10^2 = 1.
ERRFAC = 0.1;    % Fraction of nominal RMS errors by which to perturb coeff's. (to eval. "covpj").

if nargin < 5, TGT0 = []; end
         % >> TGT0 is defined. <<
```

```
dz_fit = DZ;
[ndata,dim] = size(DZ);
sigma = sqrt(SCALEMIN2/dim);

% Fit the points to a functional form (hopefully, lower-dim'l. than "dim"):
% We don't currently use last arg. (est'd. noise on base point) for anything here, so suppress it (saves
%   a little time in "collapse_shape"):

[svs,cov_svs,fitfactors,pert_facs,err_basis,df_eff,dzscl,scl]=collapse_shape(DZ,ORDER,SCALEMIN2,WEPS,ERRFAC);
        % "fitfactors(k)" ~ "confidence that 'k'-th fit describes a true manifold" / "conf. that points are
        %       Uniformly distrib'd.", which we take to be ~ prob. that points are confined to a (lower-dim.)
        %       manifold / prob. that they are Unif. distrib'd., where we also assume
        %               Prob{manifold} + Prob{Uniform distrib. on the unit ball} = 1, and
        %               Prior{manifold exists} = Prior{Uniform distrib. holds} = 1/2,
        % -- i.e., mutual exclusion and equal priors.  In this case,
        %       Prob{data is restricted to manifold ~ fit #"k"} = fitfactors(k)/s[k] / (1 + fitfactors(k)/s[k]),
        % where unity in denom. ~ Unif. distrib. (convolved with Gaussian = N[0,sigma^2], assuming
        % sigma^2 << 1) and where "s[k]" ~ std. dev. of Dirac(data confined to manifold) convolved
        % with N[0,sigma^2]), which std.dev. is precisely "sigma" -- assuming
        % that the manifold's co-dimension is 1 (otherwise, ~ "sigma^codim").  (N.B.: Std. dev., NOT variance,
        % since it is ~ merely the normalization factor for the Gaussian: "1/sigma^codim".)
fitfactors = fitfactors ./ (fitfactors + sigma);     % JM 98/6/3 & 17 & 30: "Conf. -> Prob." conversion.
        % >> "fitfactors" now ~ Prob{data are confined to the approp. manifold (~ fit)}. <<

% Now find the null space of the linear coeffs.:
        % These are guar'd. to be precisely the coeffs. for the eq's. of the tangent space & its
        % complement, because "collapse_shape" guar's. that the basis func's. it uses have value
        % = 0 & deriv. = 0 at 0 (= evolved "base" pt. ~ ctr. of nbd. DZ), except that 1st such
        % func. has value = 1 at 0, and the next "dim" such func's. have gradient = 1 (in a
        % given basis dir'n.).
        % We make one important refinement here:  If a normalized solution vector (col. of "err_basis")
        % has s.v. ~ 0 but ALSO has small linear terms, then we suppress it:  We are only interested in
        % null-space solutions that ALSO describe a (first-order) RESTRICTION ON THE DATA. (E.g.,
        % null-space saddles may be legitimate, but they don't describe anything of interest in assessing
        % the base-point's nbd. -- and the problem comes with NEAR-saddles, which have small but NON-zero
        % linear terms that only "confuse the issue".)  Specifically, we suppress according as each func's.
        % gradient (linear terms in each col. of "err_basis") fails to "restrict" (specify the pos'n. of) a
        % point more than the Uniform distrib. already restricts it (namely, to a region of radius ~
```

```
% "(1/ndata)^(1/Dm1)" [or "sqrt(SCALEMIN2/Dm1)", if this is smaller; see below for "Dm1"] -- since this
% corresp's. to changing the very shape of the distrib. of points we are given, exactly what
% we are trying to ascertain. By "restrict" we mean that the func. falls to exactly zero over
% such a region. Here, "Dm1" = "dim-1", since we are interested in saddles/non-saddles GIVEN that
% any manifold at all exists -- which we take to mean the existence of a only SINGLE restriction; this is
% a conservative assumption, but essentially generic (most solutions do not describe MULTIPLE
% restrictions -- unlike, e.g., "x^2+y^2=0", which simultaneously describes restrictions on both
% "x" & "y").
% Conclusion: We suppress by a factor based on exp(-.5*f^2), where "f" ~ (dist. to
% closest point at which linear approx. to func. falls to exactly zero) / (mean dist. to nearest nbr.
% under Unif. distrib./2) ~ 2*(abs(const. term of the given col.) / norm(linear terms of the col.)) / ...
%                ... / (1/ndata)^(1/dim). (We increase the Unif.-distr. denominator slightly, based on meas't. error.)
lintms = err_basis(2:(dim+1),:);        % Gradient (linear) terms [row of columns].
nnbr_dist = sqrt((1/ndata)^(2/(dim-1))+SCALEMIN2/(dim-1));      % ~ dist. to nearest nbr.
ans = abs(err_basis(1,:)) ./ (max(eps,rss(lintms))*nnbr_dist);  % Cf. linear approx. vs. a-priori info on pos'ns.
    grfactors = exp(-0.5*ans.^2)';      % ... to produce gradient-based suppression factors. [Col.]
factors = fitfactors .* grfactors;      % [Col.]
[nscols,svtgt,v] = svd(lintms*diag(factors));
svtgt = diag(svtgt);        % [Col.] "S.v's. of the tangent space." >> "size(svtgt)=[dim,dim]" <<.
    % "MS(svtgt)" ["MS" = "mean of squared"] = "MS(lintms*diag(factors))" <= "MS(lintms*diag(fitfactors))"~
    %       ~ "MS(lintms)*sum(fitfactors)" ~ "(1/ndata)*sum(fitfactors)". Hence, sqrt(the latter number) [or a
    %       better version of it] should serve as a (soft) threshold for detection of nontrivial linear structure
    %       in the solutions (i.e., nontriv. magnitude of some relevant columns in "lintms"): scale each of the
    %       elements in "svtgt" by it. Then "detection threshold" is scaled to unity:
svtgt = svtgt / ...     % Precaution: If NO good fits, "sum(fitfactors)" = 0; replace by WEPS in that case.
    sqrt(max(WEPS,sum(fitfactors))/ndata);  % RMS of each "lintms" col. is spread over "ndata" terms, not "dim".

% Estimation errors on "svtgt"? (Errors on "nscols" have routinely been OBSERVED to be insignificant.)
cov_svtgt = eps^2 * eye(dim);           % Initialize. SQUARE mtx. (so we get full COVAR., not just variances).
pert_facs = pert_facs ./ (pert_facs + sigma);   % "Confidence -> Prob."

for kk = 1:length(svs)      % For every s.v. of the fit ("svs"):
    % Only model a change in "svs" (hence, in "fitfactors"):
    ans = factors; ans(kk) = pert_facs(kk)*grfactors(kk);   % [Col.] "ans" ~ perturbed "factors" (~ pert'd. "svs").
        svd(lintms * diag(ans)); % [Col.]
            ans / sqrt(max(WEPS,sum(fitfactors))/ndata);    % RMS of each "lintms" col. is spread over "ndata" terms, not
"dim".
            cov_svtgt = cov_svtgt + (svtgt - ans) * (svtgt - ans)';     % OUTER product.
``` end

% "svtgt" can't possibly be more accurate than ~ "WEPS*max(svtgt)":
cov_svtgt = max(cov_svtgt, WEPS*max(svtgt)^2*eye(dim));
    % >> "cov_svtgt" is pos. def. (since "V'*cov_svtgt*V" >= "V'*eps*eye(dim)*V" strictly > 0). <<
denom = max([df_eff, WEPS, sum(fitfactors)]); % Only an UPPER LIMIT: "cov_svtgt" can't describe var'ns. in the SUPPRESSED sol'ns.
cov_svtgt = cov_svtgt / max(eps,denom) / ERRFAC^2;
    % >> "cov_svtgt" is pos. def. <<

% Compare "svtgt" values (~ std. dev. of linear part of DZ positions in each dim.) to the std. dev. of
% the noise in each dim. Intuition: The tangent space (if any) is defined to the extent that the
% linear terms of fit serve as non-trivial constraints over the nbd. Thus, a set of points
% spread over the nbd. ellipsoidally (with princ.-axis lengths = "svtgt"), but each with additive
% noise ~ "sigma", is largely unconstrained (lies within the tgt. space, instead
% of being confined to the null space) exactly to the extent that each axis length is >> noise. (Note
% that this formulation holds ONLY because we have scaled the nbd. to ~ unit radius, so that "svtgt",
% which is dimensionless [~ probability * part of unit-vector], is directly related to the scale of
% the nbd.) That is, if the nonlinear terms of the fit are ignored (we imagine "flattening the
% manifold" onto its tangent space), then the subspace is defined only to the extent that the most
% distant nbd. point, WITH its additive noise, is "significantly confined" to the subspace: lies
% within ~ 1 noise std. dev. of the closest point in the subspace.
% Refinement: If "svtgt" value is highly uncertain (could be as small as noise std. dev. or less),
% reduce confidence in the tangent space. (Specifically, add part of "svtgt"'s uncertainty to "svtgt"
% before comparing to noise std. dev. Note that we [properly] use "diag(sqrtcov(.))", NOT "sqrt(diag(.))".)

nf_denom = max(eps,svtgt+0.5*diag(sqrtcov(cov_svtgt)));% "0.5" ad hoc.

% Use "sigma^2" here, since this is the true (typ.) level of noise IN EACH DIM. (for this version):
    % Replace noise std. dev. with std. dev. of Gaussian[noise] CONVOLVED WITH
    %       Gaussian[BOUNDARY sampling uncertainty], where std. dev. of latter ~ bdy.-size represented by
    %       each point, ~ ((bdy. of unit "dim"-sphere)/ndata)^(1/(dim-1)). The std.dev.^2 of the
    %       conv'n. = sum of (std.dev.^2)'s. Hence, add "sigma^2" to (~) "V/ndata^(2/(dim-1))",
    %       for "V" the measure (length, area, volume, ...) of the boundary of the unit-radius region:
noisefacs = nnbr_dist ./ nf_denom;
    % >> "noisefacs" el'ts. >= 0. <<

% Covar. estimates of "noisefacs" for the unconstrained case (i.e., without use of TGT0 yet):

% Treat "noisefacs" as "sigma * inv(diag(nf_denom))" (and we already have "Cov[nf_denom]" ~
% "cov_svtgt"). Note that "1./noisefacs.^2" = "nf_denom.^2 / (sigma^2)" >= "eps^2/(sigma^2)".
    cov_nf = diag(1./noisefacs.^2) * cov_svtgt * diag(1./noisefacs.^2);
        % >> "cov_nf" is pos. def. <<

% Informally, "noisefacs" may be considered "strength of evidence that each princ. dir'n. is
% unconstrained" (lies in tangent space, instead of null space), with scale = unity (~ indifference);
% "cov_nf" is an explicit measure of its range of uncertainty (based on "cov_svtgt").

% Now impose the constraints (if any):
if ~isempty(TGT0),
    utgt0 = unitvec(TGT0');    % Recall that TGT0 = ROW-vector(s).
    nsc_aug = [nscols, utgt0]; % Row of unit vectors (unconstrained "nscols" & unitized TGT0').
% For constraint(s), impose "confidence" in the direction(s) (~ "noisefacs") proportional to their norms;
%       specifically, "confidence" in "nscols" directions ~ "noisefacs"; but TGT0 vectors are scaled to have
%       rms uncertainty (at their "tips") exactly equal to "sigma" -- so scale them by just
%       this factor:
% The NEW basis vectors ("nscols") & proj'n. e-val's.:
    [nscols,noisefacs_new,singvecs] = svd([nscols*diag(noisefacs) TGT0'/sigma]);

% Now update "cov_nf" for the constraints:
%       As usual, rely on e-val. differentiation (as in Fukunaga):
%       For each "j", "j-th" e-val. (with corresp. e-vec. "e-vec[j]") of a matrix "mtx" satisfies:
%               d(e-val[j]) = e-vec[j]' * d(mtx) * e-vec[j],
% which we apply to the SQUARED sing. val's. (= e-val's. of "mtx*mtx'"): here,
%           "mtx"   = "[(old)nscols*diag(noisefacs) TGT0']",
%                   which is identical to "nsc_aug*diag([noisefacs rss(TGT0')]",
%                   which we define as "nsc_aug * diag(nf_aug)";
%           "d(mtx)" = nsc_aug * "d(nf_aug)" * nsc_aug', so
%           Cov[e-vals](j,k) = "Expectation{ d(e-val[j]) * d(e-val[k]) }" =
%                   = "e-vec[j]' * E{ d(mtx) * d(mtx)' } * e-vec[k]" =
%                   = nscols(:,j)'*nsc_aug* "E{ d(nf_aug) * d(nf_aug)' }" *nsc_aug'*nscols(:,k) =
%                   = nscols(:,j)'*nsc_aug* blockdiag(cov_nf, X) * nsc_aug'*nscols(:,k),
%       where "X" must be chosen to describe the uncertainty (cov. mtx.) of "unitvec(TGT0'). Here, we adopt:
%       X = diag(rss(TGT0').^2), the obvious choice:
    cnf_aug = blockdiag( cov_nf, diag(rss(TGT0').^2)/(sigma^2));
        % At last, we know how to update "cov_nf" for the constrained case:
    cov_nf = nscols' * nsc_aug * cnf_aug * nsc_aug' * nscols;

```
        noisefacs = diag(noisefacs_new);    % No further use for (old) "noisefacs".
    end % Finally, produce (ANY reasonable!) projection mtx.:
%   The ONLY thing we care about for "svs" el'ts. is whether they are >> noise on DZ -- i.e.,
%   whether corresp. noise-factor is approx. unity:
        % Specifically, let "proj_diag" corresp. to an assessment of the PROBABILITY (or
        % at least the STAT. SIGNIF. of the hypothesis) that the data are not constrained in each
        % given direction (i.e., lie "anywhere" in the tgt. space, instead of being confined near
        % 0, as they are for the null-space dimensions) -- Gaussian distrib., as usual:
            % "1-Exp(.^2/2)" seems better than "erf(./sqrt(2))" in the "proj_diag" range ~ 0 to 1/2:
proj_diag = diag(1-exp(-0.5*noisefacs.^2));

% And the corresp. "covpj" for our actual choice of "proj_diag":
%           proj_diag(kk,kk) = 1 - exp(-.5*noisefacs(kk)^2), so
%           Cov[proj_diag(jj,jj),proj_diag(kk,kk)] = Expectation{ d(proj_diag(jj,jj)), d(proj_diag(kk,kk))} =
%                = noisefacs(jj) exp(-.5*noisefacs(jj)^2) * ...
%                        * E{ d(noisefacs(jj)) d(noisefacs(kk))} * ...
%                        * exp(-.5*noisefacs(kk)^2) * noisefacs(kk) =
%                = noisefacs(jj) * exp(-.5*noisefacs(jj)^2) * cov_nf * exp(-.5*noisefacs(kk)^2) * noisefacs(kk),
%           or, in mtx. notation:
%           Cov[ diag(proj_diag), diag(proj_diag)] = N * expm(-.5*N^2) * cov_nf * expm(-.5*N^2) * N,
%           where "N" = "diag(noisefacs)". (But we choose to write it a little differently, without "N"):
max(eps, noisefacs.*exp(-0.5*noisefacs.^2));
    covpj = diag(ans) * cov_nf * diag(ans);
return function [svs,cov_svs,fitfactors,pert_facs,err_basis,df_eff,dzscl,scl,base_noise] = ...
                    collapse_shape(DZ,ORDER,SCALEMIN2,WEPS,ERRFAC)
%collapse_shape: Find "real" shape of a nbd. of noisy pos'ns.
% The basis functions are those from "design_funcs" (i.e., low-order polynomials, augmented by
% an ad-hoc set of non-polynomials that have value=0 AND deriv.=0 at position=0 (!)).
% Effectively, if the positions lie on a manifold, we are fitting the shape of the manifold,
% to within the specified error ("level of noise").
%           [svs,cov_svs,err_basis,df_eff,dzscl,scl,base_noise]=collapse_shape(DZ,ORDER,SCALEMIN2,WEPS)
%where:
%           svs         = column of singular values of the fit;
%           cov_svs     = uncertainty (cov. mtx.) on s.v.'s in "svs", as est'd. from DZ perturbations ~
```

```
%                    sqrt(SCALEMIN2);
%         err_basis = sing. vectors = principal axes of the nonlin. fit's error ellipsoid (=SVD 3rd
%                    factor) = columns of lin. indep. basis funcs., which = non-solutions (if corresp.
%                    "svs" entry is > 0) and solutions (svs=0) for manifolds thru the points (if any);
%         df_eff    = "effective" (noise-filtered) # degrees of freedom of the fit (~ # of basis
%                    func's. actually needed for DZ to be fit to within the specified error);
%         dzscl     = factor by which to divide "DZ" to produce design mtx. (~ "design_funcs") corresp.
%                    to the fit (~ "err_basis", with goodness-of-fit ~ "svs");
%         scl       (ignored in this version)
%         base_noise = est. of the true position of the "base point" (~ manifold point closest to
%                    the origin) -- should be subtracted from origin (= "0", here) to est. the true base
%                    point;
%         DZ        = column of ("noisy") displacement vectors (i.e., each vector = 1 row);
%         ORDER     = max. order of polynomials to be fit (by "design_poly");
%         SCALEMIN2 = norm-squared DZ "noise" level for filtering (i.e., principal components of
%                    DZ that are much smaller than this will be suppressed, larger will be retained);
%         WEPS      = norm-squared DZ precision level for filtering (see Notes);
%         ERRFAC should us. be somewhat < 1 [if [] or omitted, 1 will be used as default);
%
% Notes:
% 1.      Typically, WEPS is set by data-indep. precision limits (e.g., computer or A/D hardware).
%         Conversely, SCALEMIN2 is a measure of the observation "noise", and may therefore be
%         data-set-dependent.  WEPS is taken to be a RELATIVE measure (i.e., as a fraction of the
%         data values), but SCALEMIN2 is absolute.  In both cases, "noise" is interpreted liberally:
%         It identifies effects that are small enough that the SVD fit is INTENDED to ignore them.
%         (Ordinarily, SCALEMIN2 is the relevant limit; being data-set-dependent, however, it could
%         occasionally be "artificially" small due to an accident of the data set.)
% 2.      "Collapse_shape1" uses "design_funcs" basis functions with exactly as many func's.
%         as necessary to the fit to make the corresp. design mtx. square.  Thus, effectively,
%         the full design mtx. performs a TRANSFORM of DZ, not merely a "fit".)
%         The fit applies only to the data AFTER SCALING by "dzscl" (~ max. length, so scaled
%         data satisfy "max(abs2(<data>)) ~ 1").
%         More generally, ANY col. of row-vectors "M" may be eval'd. for the "k"-th fit by the expr.
%                    design_funcs(M/dzscl,n,ORDER) * err_basis(:,k),
%         where "n" = # points in DZ (NOT in "M"!).  See also the Example.
% 3.      For "n" = "size(DZ,1)" data points, "n-df_eff" is approx. the dim. of the NULL space
%         of the fit -- the number of dim's. that are (near-)perfectly fit by the other dim's.
%         In particular, the tangent space is defined by the linear (& constant) terms of the fit.
```

```
%          HOWEVER: These terms (and all others) generally decrease as ~ "1/df_eff^(1/2)".
%          Recall that the fit is defined by the homogenous eq. "f(DZ)~0", so a scale factor has no
%          direct effect on the fit's coeffs.; but it DOES affect the scale of the goodness-of-fit:
%          To describe a complete fit "f(DZ)=0" that is supposed to be accurate to
%          +-"sigma", the coeffs. should not be rescaled;
%          but to describe a feature (notably, the tangent space) that is INDEP. of
%          "size(DZ,1)" (assuming that at least the minimum needed # of points are present), the coeffs.
%          of that feature should be mult'd. by "df_eff^(1/2)" BEFORE comparing to SCALEMIN2.
% 4.      For "size(DZ)" = "[n,dim]", "n" must be AT LEAST as large as "poly_terms(ORDER,dim)".
%          Because as many non-poly. functions as needed are added to the poly's., the fit is largely
%          INDEP. of ORDER; that is, "svs", etc., should be little changed, and the constant,
%          linear, and quadratic coeffs. should be little affected by using ORDER=2 instead of any higher
%          value; likewise, ORDER=1 should produce virtually the same const. & linear coeffs. (although
%          very different other coeffs., because no quadratic poly. is used in the fit).
% 5.      If the data DZ are generated from a fit, the coeffs. found are NOT necessarily the ones
%          used to generate the fit. They will, however, be other coeffs. that fit the (scaled) data
%          approx. equally well (to within ~ "sqrt(SCALEMIN2)"), AND for which certain nearby points (with
%          rms distance from DZ points ~ sqrt(SCALEMIN2)) fit ~ perfectly (<< "sqrt(SCALEMIN2)").
% 6.      The covariance mtx. for the est'n. errors in any NON-null-space fit may be computed by
%                      svdcov(err_basis,svs),
%          because "diag(svs)" are precisely the "edited" (noise-filtered) sing. values that are needed
%          for this computation.
%
%See also: design_funcs, design_poly, design_aug, poly_terms.

MARGIN = 1.3;    % Ad hoc "margin of error" for convergence tests (slightly > 1).
MAXITERS = 5;
SMALL_FRAC = 0.2;       % Some strictly positive Real significantly < 1 (but NOT tiny).
if nargin < 5, ERRFAC = []; end
if isempty(ERRFAC), ERRFAC = 1; end

[npts,dim] = size(DZ);

sigma = sqrt(SCALEMIN2/dim);

% Begin:
  dz_prev = DZ;
  [svs,cov_svs,err_basis,df_eff,dzscl,scl]=collapse_shape1(dz_prev,ORDER,SCALEMIN2,WEPS);
```

```
%========
%===    At this point, the tangent space may be extracted by this three-step algo.:
%===            multiply every column of the sing. vectors ("err_basis") by unity MINUS the "confidence"
%                   that its corresp. s.v. is non-zero (thus, 0 -> 1, big -> 0), to produce "V~";
%                extract the linear terms from V~ (i.e., the block V~(1+(1:dim), :));
%                perform SVD on the result, thus extracting the non-trivial terms (linearly indep. & non-zero):
%                   the corresp. princ. comp's. ("U") [? -- or maybe s.vec's.?] are the tgt-space dir'ns.
%===    The perturbations to "DZ" are given by mapping the points to their closest images on the manifold
%===    [if there is a non-triv. manifold] -- i.e., by solving the system:
%                   pert (proportional to) grad(V~),
%       where "pert" = the matrix of perturbations, normalized appropriately (and tested for chi-sq. ~ "N"?).
%       Note that "grad(V~)" is taken on the man. (or, to 1st order, at the noisy point itself). Also,
%       this is equiv. to "0 = pert (cross) grad(V~)". In either case, the pert's. must be "PRINC. sol'ns."
%       to the linear system. (There will, in gen., be many degeneracies, too.)
%========
[fitfactors,pert_facs] = collapse_shape2(svs,cov_svs,ERRFAC);

if nargout >= 9,    % <Base|
    % Solve by using the fit we found (and only if the fit is not ~ SADDLE at base point -- i.e.,
    % gradient not too small -- see more explan. in "tgt_space"):
        lintms = err_basis(2:(dim+1),:);        % Gradient (linear) terms [row of columns].
        nonlinrms = rms(err_basis(dim+2:npts,:));       % "Avg. strength" of all higher-order terms in fit.
        % A "good" linear fit (at the origin) is one dominated by the const. & linear terms, NOT the
        % higher-order ones. Specifically, over a distance ~ noise on the base point, we require that
        % the linear terms (i.e., gradient) be >> "typical" nonlinear ones -- i.e., that
        %       sigma*nonlinrms ./ rms(lintms)
        % be << 1. Note that this reasoning does NOT apply to the other DZ's: We wish to estimate
        % behavior in the nbd. of the base point (so curvature matters to the DESCRIPTION); we do
        % not care whether curv. or any other effect permits/forbids a solution that passes within
        % "sigma" of a point (curv. does not matter for the FIT -- the underlying "reality"), since
        % "cov_svs" (hence, "fitfactors") already tells us whether such DZ perturbations could give
        % an acceptable solution (for every point, base or otherwise); indeed, if we wanted a fuller
        % (hence, more complete, & more complicated) description, we might remove "grfactors" entirely.
        grfactors = exp(-0.5*(sigma^2) * (nonlinrms./max(eps,rms(lintms))).^2)';        % [Col.]
        G = diag(fitfactors./(fitfactors+sigma)) * diag(grfactors);
            % "lintms*G" describes func. fits that should describe "non-trivial structure" over the nbd --
            %   i.e., for which a func. should grow from 0 (at base pt.) to >> noise, at least over
            %   the diam. of the whole nbd., or mean inter-point distance:
```

% Scale of non-zero "lintms" is not "sigma":
  base_noise = err_basis(1,:)*G*pinv(lintms*G);     % [Row.]
% Finally, since this choice of "base_noise" minimizes ~ rms error of "err_basis*G", when used with
%   "design_funcs(./dzscl,npts,ORDER)]", we must compensate for the "dzscl" scaling that was
%   used in those functions to produce the design mtx. of the fit:
  base_noise = base_noise * dzscl;     % [Row.]
% >> "base_noise" is an est. of the error in the base point = displacement of tgt. space from
%       the coord. origin. <<
% As such, "base_noise" should be SUBTRACTED from the (present est. or initial measured value
%   of the) base point to give a new (presumably better) est. of that point. If not already
%   perpendicular to the tgt. space (as is sometimes observed in some implem'ns.), it
%   should be projected to BE perp. (i.e., base_noise <- base_noise * (tgt.projn - eye)).

% Slight refinement: Allow small change of scale of "base_noise" (~ 2x), but ONLY to the extent that its
%   norm is <~ "sigma" (i.e., "sigma"). Specifically, check the improvement (compared to NO
%   displacement from origin) TIMES the relative prob. density [~ Gaussian] of such change:
  bns = -[0:.2:2]'*base_noise; % "Base-Noises": Column of row-vectors (choices of negated base-noise).
  design_funcs(bns/dzscl,npts,ORDER);
  ans * err_basis * G;     % "*G" to discard non-solutions in "err_basis".
  rms(ans');     % [Row.] How "good" is each choice, across all solutions?
  (ans(1) - ans) .* exp(-0.5*rms(bns').^2/sigma^2);     % Suppress by "prob." ~ norm (= "rss(.)^2").
  min(find(ans==max(ans)));% (Earliest) Index of "best" (or likeliest) choice of base-noise.
  base_noise = -bns(ans,:);

end     % |Base>
return function [svs,cov_svs,err_basis,df_eff,dzscl,scl]=collapse_shape1(DZ,ORDER,IGN_LVL,WEPS)
%collapse_shape1: Find "real" shape of a nbd. of noisy pos'ns. in terms of partic. basis func's.
% The basis functions are those from 'design_poly' (i.e., low-order polynomials) augmented by
% an ad-hoc set of non-polynomials that have value=0 AND deriv.=0 at position=0 (!).
% Effectively, if the positions lie on an attractor, we are fitting the shape of the attractor,
% to within the specified error ("level of noise").
%       [svs,cov_svs,err_basis,df_eff,scl]=collapse_shape1(DZ,ORDER,IGN_LVL,WEPS)
%where:
%       svs     = list [column] of sing. values of the fit (scaled by "dzscl"), corrected for noise:
%                       sv -> ~ sv / (1 + (noise/sv)^2)
%                       (a Weiner-like corr'n. for the RECIPROCAL, when noise << sv -- but meaningful even

```
%                  when noise >> sv) -- so that these values are large only when
%                  the orig. values are both large AND reliable (i.e., much larger than noise);
%       cov_svs  = est'd. (cov. of) errors on "svs";
%       err_basis = o.n. basis for all fits to "f(DZ)=0" (columns for which corresp. "svs" is near 0),
%                  plus o.n. basis for non-fits ("svs" signif. > 0);equals SVD 3rd factor of design
%                  matrix;
%       df_eff   = "effective" (noise-filtered) # degrees of freedom of the fit (~ # of basis
%                  func's. actually needed for DZ to be fit to within the specified error);
%       dzscl    = factor by which to divide "DZ" to produce design mtx. (~ "design_funcs") corresp.
%                  to the fit (~ "err_basis", with goodness-of-fit ~ "svs");
%       scl      = multiplier ("scale") on sqrt(IGN_LVL) to achieve total DZ noise energy equal to
%                  IGN_LVL*size(DZ(:)) (since some components of DZ may be too small for this
%                  level of noise, so we infer that some must be larger in order to produce this total);
%       DZ       = column of ("noisy") displacement vectors (i.e., each vector = 1 row);
%       ORDER    = max. order of polynomials to be fit (by "design_poly" -- also influences choice
%                  of non-poly's. in "design_aug") -- see "design_funcs";
%       IGN_LVL  = norm-squared DZ "noise" level for filtering (i.e., principal components of
%                  DZ that are much smaller than sqrt of this level will be suppressed ("IGNored"),
%                  larger will be retained);
%       WEPS     = norm-squared DZ (relative) precision level for filtering. (See Notes.)
%
% Notes:
% 1.    For "n" = size(DZ,1) data points, "n-df_eff" is approx. the dim. of the NULL space
%       of the fit -- the number of lin. indep. sol'ns. to "f(DZ)=0".
% 2.    For size(DZ) = "[n,dim]", "n" must be AT LEAST as large as "poly_terms(ORDER,dim)".
% 3.    The coeffs. of the fit are found from the null space -- i.e., the columns of "err_basis"
%       corresp. to the "zero" s.v.'s returned in "svs" (where "zero" means "0 to within 'cov_svs'
%       limit"). This can be most easily computed from the columns of (e.g.)
%              err_basis * diag(exp(-0.5*(svs).^2./diag(cov_svs)))
%       (or sim. exponents using "diff_chisq").
% 4.    If the data DZ are generated from a fit, the coeffs. found are NOT necessarily the ones
%       used to generate the fit. They will, however, be other coeffs. that fit the data
%       approx. equally well (within ~ sqrt(IGN_LVL/dim) in each component), AND that fit ~ perfectly
%       at points differing by ~ sqrt(IGN_LVL) (rms over the points) in distance from DZ.
% 5.    For other notes, see "collapse_shape".
%
% See also: "design_funcs", design_poly, design_aug, poly_terms, collapse_shape.
```

CONF_THR = 0.9; % Confidence threshold (for Chi-Sq. tests): moderate.

[ndata,dim] = size(DZ);
dmax = sqrt( max(sum(DZ'.^2)) / dim); % ~ Max. abs. value of DZ (vectors') components.
dmax = dmax * sqrt(dim);

dzscl = dmax;       % Exactly the factor we will use in "design_funcs".
% Fill the design matrix (so it is square, hence alg. complete):
%   Note that we use the 3rd arg. to "design_poly", to reduce est'n. biases in the coeff's. we
%   will compute from the design mtx.:
 desmtx = design_funcs(DZ/dzscl,ndata,ORDER,sqrt(IGN_LVL/dim)/dzscl);

% Now solve for coefficients of the fit:
  [uu,ss,err_basis] = svd(desmtx);

scl = 1;% Irrelevant in this version.

svs = diag(ss) * dzscl;

% How uncertain are the sing. values? Esp., could any be just perturbations from zero? And what of correl'ns?
% Pert. by "small" amount: 1/10 of "noise" level:
%   Note that we compare s.v's. to those of the SIMPLE design mtx. "dmtx0" (not "desmtx", which includes
%   bias corr'ns.): We ASSUME that variation in "svs" wrt. perturbations in DZ EQUALS variations in s.v's.
%   of "dmtx0" wrt same pert's. in DZ:

dmtx0 = design_funcs(DZ/dzscl,ndata,ORDER);
 ss0 = svd(dmtx0);
 delta = sqrt(IGN_LVL/dim)/10;
 sumprod_ss = 100*eps*max(ss0)^2*eye(ndata); % ~ guarantees that "sumprod_ss" will always be invertible.
 for jj = 1:dim
  ddz = delta*[zeros(ndata,jj-1) ones(ndata,1) zeros(ndata,dim-jj)];
  desmtx_pert = design_funcs((DZ+ddz)/dzscl,ndata,ORDER);         % Change every point's "jj"-th component:

for kk = 1:ndata  % Pert. each point independently of all others:
      dtmp = dmtx0; dtmp(kk,:) = desmtx_pert(kk,:);
      ss_pert = svd(dtmp);          % [Col.] S.v's. of pert'd. data.
      pert_ss = (ss0 - ss_pert) * sqrt(IGN_LVL/dim) / delta;       % [Col.] Scale up to ONE-"sigma" pert's.
      sumprod_ss = sumprod_ss + pert_ss*pert_ss';

```
end
end cov_svs = dzscl^2 * sumprod_ss/(ndata*dim);   % Just how far from zero are the (scaled) s.v.'s?

inv(sqrtcov(cov_svs));
  ans * ss^2 * ans;  % This is a "squared variance" mtx. of sorts (i.e., ~ ss^2), so ...
  sqrtcov(ans);              % ... get back to NON-squared qty's.
  df_eff = rank_w( ans, max(sqrt(WEPS)*norm(ans),1));   % "rank_w(.., _1_)" since "ans" ~ ratio: ss/rms(ss).

function [fitfactors,pert_facs] = collapse_shape2(svs,cov_svs,ERRFAC)
% "Confidence factors" & their perturb's. for each "collapse_shape" fit to a data set.
% NOTE: This routine performs no error checking; it intended for exclusive use by
%       "collapse_shape".
% "svs" must be a COLUMN vector (size "Nx1"), "cov_svs" must be strictly positive-definite of
%   size "NxN", ERRFAC must be a pos. Real scalar
%   (~ 1 or somewhat smaller, typically).

nn = length(svs);
fracs = (1:nn)' / (nn+1);      % [Col.] "Percentiles" [or "fractiles"] for probabilities.
          % Inverse of cumulative distrib. func. for Chi-Sq.[1 d.f.] is "PHIinv((P_1+1)/2)^2":
std_threshs = PHIinv((fracs+1)/2).^2;  % [Col.]  % Cache-able, but too cheap to matter.
          % "std_threshs(k)" (any "k" in 1:"nn") is the EXPECTED value of the"k"-th-smallest
          % of ANY set of "nn" Chi-Sq[1]-distrib'd. random variables -- so use IT (not unity) as
          % the "diff_chisq" threshold for the "k"-th-smallest observed value of "svs" (or,
          % actually, "zs").

rms_svs = sqrt(diag(cov_svs));     % [Col.]
[evecs,evals] = eig(cov_svs);

% Find "fitfactors" ~ "goodness of fit" for each "svs" value:
    % Convert "svs" to (signed) "Z" statistics in "cov_svs"'s principle-axis coord's.:
    zs = inv(sqrt(evals))*evecs'*svs;      % [Col.]
% Use correct cumulatives of "Chi-Sq" (since "zs" is a SET [no longer sorted, as
%   "svs" is], so, e.g., SMALLEST squared values SHOULD be << "sigma^2", even for the assumed
%   Gaussian white noise):
    [zssort2,sortperm] = sort(zs.^2);       % >> "zssort2" is a column-vector. <<
    zssort_redd2 = diff_chisq(zssort2,std_threshs);  % [Col.] "Reduced [sorted] z's, squared".
```

% Need to invert the permutation ("sortperm") here:

zs_redd2 = zssort_redd2(inverse_perm(sortperm));    % [Col.] "Red'd. z^2's" (back in "zs"'s order).

ans = zs; ans(zs==0) = eps^4;    % [Col.] So 0/0 -> 0, but 1/0 -> huge (& positive).

ans = zs_redd2 ./ ans;    % [Col.]

ans(isnan(ans)) = 1; % [Col.] "0/0" really means "0^2/0" -- i.e., ZERO.

svs_redd = evecs * sqrt(evals) * ans;  % [Col.] "Reduced" s.v.'s, back in ORIG. coord's.

% NEVER keep low-precision s.v.'s: (Note that "svs_redd" might be slightly < 0 now:
%   Interpret such values as 0.)

fitfactors = exp(-0.5*(max(0,svs_redd)./rms_svs).^2);    % [Col.]

% "fitfactors(k)" ~ "confidence that "k"-th fit describes a true manifold" /
% "conf. that points are Uniformly distrib'd.", which we take to be
% ~ prob. that points are confined to a (lower-dim.) manifold / prob.
% that they are Unif. distrib'd., where we also assume
%         Prob{manifold} + Prob{Uniform distrib. on the unit ball} = 1, and
%         Prior{manifold exists} = Prior{Uniform distrib. holds} = 1/2,
% -- i.e., mutual exclusion and equal priors. In this case,
%         Prob{data is restricted to manifold ~ fit #"k"} =
%             fitfactors(k)/s[k] / (1 + fitfactors(k)/s[k]) [Bayes],
% where unity in denom. ~ Unif. distrib. (convolved with Gaussian =
% N[0,sigma^2], assuming sigma^2 << 1) and where "s[k]" ~ std. dev.
% of Dirac(data confined to manifold) convolved with N[0,sigma^2]),
% which std.dev. is precisely "sigma" -- assuming that the manifold's
% co-dimension is 1 (otherwise, ~ "sigma^codim"). (N.B.: Std. dev.,
% NOT variance, since it is ~ merely the normalization factor for the
% Gaussian: "1/sigma^codim".)    %++ & factors of "pi"?

% Now find "pert_facs" = "goodness of fit" when each s.v. is perturbed by ~ ERRFAC * its
% uncertainty.

ans = svs + ERRFAC*rms_svs;    % [Col.] Perturb s.v.'s POSITIVELY (no possible sign changes).

zs_pert = inv(sqrt(evals))*evecs'*ans;    % [Col.]

[zsps2,sortpermp] = sort(zs_pert.^2);

% "0/0" here really means "0^2/0" -- i.e., ZERO:

ans = diff_chisq(zsps2,std_threshs); % [Col.]

zspno0 = zs_pert; zspno0(zs_pert==0) = eps^4;

% Invert permutation:

ans = ans(inverse_perm(sortpermp)) ./ zspno0;    % [Col.]

% Convert back to "ordinary" s.v.'s (some may be slightly < 0 now: Again interpret as 0):

```
pert_redd = evecs * sqrt(evals) * ans;% [Col.]
pert_facs = exp(-0.5*(max(0,pert_redd)./rms_svs).^2);    % [Col.] >> "pert_facs" in [0,1]. << if min([pert_redd; svs_redd]) < 0,    % [Col.] Any instances of "unphysical" processing artifacts?
    % Keep such "fitfactors", but make sure corresp. "pert_facs" differ at least slightly (since
    % we know that the TRUE value of "fitfactors(k)" should be taken from the TRUE -- hence,
    % slightly different -- value of "svs_redd(k)".
    % Specifically, set "pert_facs(k)" [for each such "k"] to "tiny * range of allowed
    % 'fitfactors'" -- i.e., to "eps * 1":
    badndxs = min([svs_redd'; pert_redd'])'<0;    % [Col.] Where does the problem occur?
    badndxs & fitfactors<=1/2;        % [Col.]
        pert_facs(ans) = max(pert_facs(ans),fitfactors(ans)+eps);    % [Col.]
    badndxs & fitfactors>1/2;         % [Col.]
        pert_facs(ans) = min(pert_facs(ans),fitfactors(ans)-eps);    % [Col.]
end
function dmtx = design_funcs(POSNS,NCOLS,ORDER,NOISE_SDS)
%design_sqmtx: Form design matrix for specified # of func. fits at given Real^n pos'ns.
%       dmtx = design_funcs(POSNS,NCOLS,ORDER,NOISE_SDS)
% where:
%       dmtx = the design matrix;
%       POSNS  = the positions (ROW-vectors in Real^n) at which we will (later) want to
%                eval. the function (by later determining its coefficients): = no. of rows of
%                "dmtx";
%       NCOLS  = no. of columns (~ no. of separate func. "fits") for "dmtx"; optional --
%                if [], the value size(POSNS,1) will be used (resulting in a SQUARE output);
%       ORDER  = the max. polynomial order to which we will (later) attempt fitting;
%       NOISE_SDS = vector of std. dev.'s of noise in each component of the POSN vectors,
%                to be used as offset to account for bias resulting from curvature
%                (2nd-deriv.) effects -- ignored (equiv. to 0) if [] or missing.
%
% Notes:
% 1.    Each function to be fit (by finding its coeff's.) is taken to be the sum of a
%       polynomial with order = ORDER plus a non-poly. with enough terms to make up a total
%       of "NCOLS" columns. The non-poly. terms are taken from "design_aug" (q.v.). This
%       requires that
%               NCOLS >= "poly_terms(ORDER,n)"
%       (the minimum occurring when NO "design_aug" terms will be included). The "design_aug"
%       terms will occur AFTER all polynomial terms in the fit. The matrix thus consists of:
```

```
%                dmtx = [design_poly(POSNS,ORDER) design_aug(POSNS,k,ORDER)]
%           for a suitable value of "k" (in the case where NOISE_SDS is missing).
% 2.       We will later perform some number of (say) least-squares "fits" of functions through
%           the specified positions in Real^n (for "n" = "size(POSNS,2)"), by determining the
%           coeff's. C(i,j,...) in:
%                P(X) = C(0,0,...) + C(1,0,...)*x + C(0,1,...)*y + C(1,1,...)*x*y +
%                       C(2,0,...)*(cos(x)-1) + ... [assuming "cos(x)-1" is a "design_aug" func.],
%              where <x,y,...> are the components of X, an arb. position in Real^n.
% 3.       Rows in POSNS must be distinct. THIS IS NOT CHECKED IN ANY WAY. (This routine
%           will perform correctly even in that case, however -- but the later fits will be
%           underdetermined.)
% 4.       "size(dmtx,1)" = "size(POSNS,1)", corresp. to one row for each position.
% 5.       A scalar value of NOISE_SDS will be interpreted as a vector (of correct
%           dimensionality), all of whose components have that value.  Noise is assumed
%           UNCORRELATED between components of the vectors in POSNS.
% 6.       NOISE_SDS should be a row-vector. However, if specified as a column-vector,
%           it will be transposed and a warning msg. given.
% 7.       For explanation of the bias effect, see "design_poly".
%
% See also: poly_terms, design_poly, design_aug.

dim = size(POSNS,2);        % Dimensionality of the space (= # of indep. variables).
ptms = poly_terms(ORDER,dim);     % The number of polynomial terms to be included.

if isempty(NCOLS), NCOLS = size(POSNS,1); end       % Square "dmtx"?

if nargin > 3,      % <Noise|         Any use for NOISE_SDS?
   if all(NOISE_SDS==0), NOISE_SDS = []; end
   if length(NOISE_SDS) == 1, NOISE_SDS = NOISE_SDS * ones(1,dim); end
   if size(NOISE_SDS,2) == 1,
         NOISE_SDS = NOISE_SDS';
   end
else      % <Noise|         NOISE_SDS missing entirely.
   NOISE_SDS = [];
end        % |Noise> dmtx = [design_poly(POSNS,ORDER,NOISE_SDS) design_aug(POSNS,NCOLS-ptms,ORDER,NOISE_SDS)];
```

```
function dmtx = design_aug(POSNS,NFITS,ORDER,NOISE_SDS)
%design_aug: Form design matrix for fits to certain NON-polynomials at given Real^n pos'ns.
%         dmtx = design_aug(POSNS,NFITS,ORDER,NOISE_SDS)
% where:
%         dmtx    = the design matrix (consisting of values of the non-polynomials at POSNS);
%         POSNS   = the positions (ROW-vectors in Real^n) at which we will (later) want to
%                   eval. the non-polynomials (by later determining their coefficients);
%         NFITS   = the number of non-poly's. to which we will later attempt fitting;
%         ORDER   = the max. non-polynomial "order" to which we will (later) attempt fitting;
%                   see Notes;
%         NOISE_SDS = vector of std. dev.'s of noise in each component of the POSN vectors,
%                   to be used as offset to account for bias resulting from curvature
%                   (2nd-deriv.) effects (see Notes) -- ignored (equiv. to 0) if [] or missing.
%
% Notes:
% 1.      The non-polynomials are ad-hoc, but chosen to:
%                   be linearly independent of each other EVEN WHEN COMBINED with polynomials
%                           (of degree <= ORDER) -- e.g., "sin(X(1))" & "sin(X(1))-2*X(2)" are
%                           NOT both used in the set, because either is a linear comb. of the
%                           other with a low-order polynomial;
%                   be "poorly" fit, on [-1..+1]^n, by polynomials of degree <= ORDER;
%                   have values ~ unity (up to ~10), and variance ~ unity (< ~10), on [-1..+1]^n;
%                   have value = 0 and gradient = 0 at 0(!)
%                   GENERALLY have derivatives of order > ORDER NON-zero at 0 (for at least one
%                           such func.)
%                   have "LOW" (not nec. 0) correlation with const. & linear functions, when
%                           integrated over "[-1,+1]^n" (for Cart.product, for "n" = dim.)
%                   -- for examples, "cos(x)*cos(y)-1", or "sin(2*x)-2*x" (for components "<x,y,...>" of
%                   Real^n). Thus, they are NOT COMPLETE. The matrix returned is, however, intended to
%                   be suitable to "augment" "design_poly(POSNS,ORDER)" to form a square design matrix
%                   of full rank (for "most, arbitrary" sets of POSNS).
% 2.      We will later perform some number of (say) least-squares "fits" of the
%                   non-polynomials through the specified positions in Real^n (for "n" =
%                   "size(POSNS,2)"), by determining the coeff's. C(i,j,...) in:
%                           P(X) = C(0,0,...) + C(1,0,...)*f1(x) + C(0,1,...)*f1(y) +
%                                   C(1,1,...)*f2(x*y) + C(2,0,...)*f2(x^2) + ...,
%                           where <x,y,...> are the components of X, an arb. position in Real^n, and
%                           "f1", "f2", ... are some non-polynomial functions (Real -> Real).
```

% 3.    Rows in POSNS must be distinct. THIS IS NOT CHECKED IN ANY WAY. (This routine
%       will perform correctly even in that case, however -- but the later fits will be
%       underdetermined.)
% 4.    POSNS = precisely the sample points to which we will attempt to fit a single
%       non-poly. Thus, "size(POSNS,1)" = the number of linearly indep. fits we will
%       (later) attempt, and "size(POSNS,2)" = dimensionality of the space.
% 5.    "size(dmtx,1)" = "size(POSNS,1)", corresp. to one row for each position. (The
%       number of coeff's. to be fit = "size(dmtx,2)" equals NFITS.
% 6.    A scalar value of NOISE_SDS will be interpreted as a vector (of correct
%       dimensionality), all of whose components have that value. Noise is assumed
%       UNCORRELATED between components of the vectors in POSNS.
% 7.    NOISE_SDS should be a row-vector. However, if specified as a column-vector,
%       it will be transposed and a warning msg. given.
% 8.    See "design_poly" for a discussion of the use of NOISE_SDS to remove
%       curvature-induced bias when the POSNS vectors have noise.
% Example:
%       design_aug(POSNS,1,1) will produce a design matrix suitable for fitting certain
%       non-poly's. that are NOT well approx'd. by a linear polynomial (a plane) through
%       the "size(POLY,1)" points in "size(POLY,2)"-dimensional space.
% See also: design_poly.

dim = size(POSNS,2);        % Dimensionality of the space (= # of indep. variables).

if nargin > 3,     % Any use for NOISE_SDS?
  if all([NOISE_SDS(:); 0]==0), NOISE_SDS = []; end
  if length(NOISE_SDS) == 1, NOISE_SDS = NOISE_SDS * ones(1,dim); end
  if size(NOISE_SDS,2) == 1,
        NOISE_SDS = NOISE_SDS';
        warnmsg('Noise std.dev(s) in "design_aug" should be a ROW-vector; transposed.')
  end
        % >> NOISE_SDS = [] or else non-zero row-vector. << if ~isempty(NOISE_SDS),
  % Note that, for ANY smooth function "f" with 2nd deriv. "g",
  %            <f(X)> = f(<X>) + (V/2)*<g(X)>,
  % for variance "V" of the r.v. "X". Thus, approx'g. "g" by (f(.+a)-2*f+f(.-a))/a^2
  %    (for any "small" "a"), we have, in the special case "a^2" = "V":
  %            f(<X>) =~ <f(X)> - (V/2)*<g(X)> =~ <2*f(X) - (f(X+a)+f(X-a))>.

```
% Note that, for indep. errors in "X" (as assumed), we replace "g" by Laplacian[f],
% and, corresp., "2f(X) - 0.5*(f(X+a)+f(X-a))" by
%               "(dim+1)*f(X) - 0.5*a^2*sum[j=1:dim](f(X+a*e[j])+f(X-a*e[j]))", where
% "e[j]" = unit vector along "j"-th axis.
   dmtx = 0;
      for row = 1:dim
         ones(size(POSNS,1),1) * [zeros(1,row-1) NOISE_SDS(row) zeros(1,dim-row)];
            % >> "size(ans)" = "[number-of-POSNS, dim]" (indep. of "row"). <<
         dmtx = dmtx + ...
               (design_aug(POSNS+ans,NFITS,ORDER)+design_aug(POSNS-ans,NFITS,ORDER));
      end
      dmtx = (dim+1)*design_aug(POSNS,NFITS,ORDER) - 0.5*dmtx;
      return
   end
end dmtx = [];

pmtx = ones(size(POSNS,1),1);
s = POSNS * pi;   % >> "norm(s)" ~ pi (~ 1), if (as typical) "norm(POSNS)" ~ 1. <<
s2 = s.^2 / 2;

j = ceil(ORDER/2) - 1;
while size(dmtx,2) < NFITS
 j = j + 1;
      % "Value ~ 0, deriv. ~ 0" (for both "sin" & "cos" terms):
      % In fact, do a little better: "Squash" func.
      %  in a nbd. of 0 (~ "1-1/(1+x^2)"); note that 3rd deriv. at zero must be
      %  non-zero (at least if ORDER < 3), so avoid "sin(x)-x/(1+x^2/6)", which
      %  WOULD have 3rd deriv. = 0 at 0):
(1-1./(1+j^2*s2));
sintms = sin(j*s) .* ans;
costms = cos(j*s) .* ans;
pmtxsintms = [];  % "A certain product of old 'pmtx' and new 'sintms'."
pmtxcostms = [];
onesarr = ones(1,size(pmtx,2));

for k = 1:dim
```

```
        pmtxsintms = [pmtxsintms (sintms(:,k)*onesarr) .* pmtx];
        pmtxcostms = [pmtxcostms (costms(:,k)*onesarr) .* pmtx];
    end pmtx = [pmtxcostms pmtxsintms];
    dmtx = [dmtx j*pmtx];
end     % While.

dmtx = dmtx(:,1:NFITS);

function ex = diff_chisq(Z,ALPHA,N)
%Approx. "typical" value for a (scaled) Chi-Squared random var. in an observed sum of 2 such r.v's.
%We estimate the "typ." value as the trivial value = difference, clipped at 0.

if Z == 0, % Even if ALPHA undefined.
    ex = 0;
else
    ex = max(0,Z-ALPHA);    % Biased est., but trivial (not even any N-dependence).
end
function dmtx = design_poly(POSNS,ORDER,NOISE_SDS)
%design_poly: Form design matrix for specified # of fits to polynomial at given Real^n pos'ns.
%       dmtx = design_poly(POSNS,ORDER,NOISE_SDS)
% where:
%       dmtx = the design matrix;
%       POSNS = the positions (ROW-vectors in Real^n) at which we will (later) want to
%               eval. the polynomial (by later determining its coefficients);
%       ORDER = the max. polynomial order to which we will (later) attempt fitting;
%       NOISE_SDS = vector of std. dev.'s of noise in each component of the POSN vectors,
%               to be used as offset to account for bias resulting from curvature
%               (2nd-deriv.) effects (see Notes) -- ignored (equiv. to 0) if [] or missing,
%               or if ORDER < 2.
%
% Notes:
% 1.    We will later perform some number of (say) least-squares "fits" of polynomials
%       through the specified positions in Real^n (for "n" = "size(POSNS,2)"), by
%       determining the coeff's. C(i,j,...) in:
%           P(X) = C(0,0,...) + C(1,0,...)*x + C(0,1,...)*y + C(1,1,...)*x*y +
%                   C(2,0,...)*x^2 + ...,
```

```
%                 where <x,y,...> are the components of X, an arb. position in Real^n.
% 2.    Rows in POSNS must be distinct. THIS IS NOT CHECKED IN ANY WAY. (This routine
%       will perform correctly even in that case, however -- but the later fits will be
%       underdetermined.)
% 3.    POSNS = precisely the sample points to which we will attempt to fit a single poly.
%       Thus, "size(POSNS,1)" = the number of linearly indep. fits we will (later) attempt,
%       and "size(POSNS,2)" = dimensionality of the space.
% 4.    "size(dmtx,1)" = "size(POSNS,1)", corresp. to one row for each position. (The
%       number of coeffs. to be fit = "size(dmtx,2)" is a more complicated function of the
%       order & dimensionality, given by "poly_terms(ORDER,size(POSNS,1))".)
% 5.    A scalar value of NOISE_SDS will be interpreted as a vector (of correct
%       dimensionality), all of whose components have that value. Noise is assumed
%       UNCORRELATED between components of the vectors in POSNS.
% 6.    NOISE_SDS should be a row-vector. However, if specified as a column-vector,
%       it will be transposed and a warning msg. given.
% 7.    The bias effect arises when solving nonlinear (ORDER > 1) least-square problems:
%       The expected value of "X^2" (for a random variable "X" -- scalar, WLOG) is
%             <X^2> = <X>^2 + Variance[X].
%       Therefore, if performing a LS fit to a (nonlinear) polynomial, given "inputs" X[i]
%       and "outputs" Y[i] -- i.e., solving "Y = a + b*X + c*X^2" for the coefficients
%       "[a,b,c]" -- the result will be biased if "X" itself has errors. This occurs since:
%             <Y> = a + b*<X> + c*<X^2> = a + b*<X> + c*(<X>^2 + Var[X])
%       -- i.e., we can only fit "<Y> = f(<X>)", although we need "Y=f(X)" (hence,
%       "<Y> = <f(X)>"). Therefore, given NOISY values of "X" -- X = X0 + noise, for
%       <noise> = 0, Var[noise] = "V"
%       -- the coeffs. will be incorrectly determined if "V" > 0, with a bias that does
%       NOT fall to 0 as the number of observations rises to infinity. The
%       noise-std.dev's. vector is used to eval. the approx. 2nd-deriv. effects numerically
%       (NOT symbolically), and then to scale the 2nd-deriv. term before adding to the
%       zero-noise (max. likelihood) term.
%
% See also: poly_terms, design_aug.

dim = size(POSNS,2);        % Dimensionality of the space (= # of indep. variables).

if ORDER > 1 & nargin > 2,   % <Noise|          Any use for NOISE_SDS?
  if all([NOISE_SDS(:); 0]==0), NOISE_SDS = []; end
  if length(NOISE_SDS) == 1, NOISE_SDS = NOISE_SDS * ones(1,dim); end
```

```
if size(NOISE_SDS,2) == 1,
    NOISE_SDS = NOISE_SDS';
    warnmsg('Debias-offset in "design_poly" should be a ROW-vector; transposed.')
end % >> NOISE_SDS = [] or else non-zero row-vector. << if ~isempty(NOISE_SDS),
    % Note that, for ANY smooth function "f" (polynomial or not) with 2nd deriv. "g",
    %              <f(X)> = f(<X>) + (V/2)*<g(X)>,
    % for variance "V" of the r.v. "X". Thus, approx'g. "g" by (f(.+a)-2*f+f(.-a))/a^2
    %     (for any "small" "a"), we have, in the special case "a^2" = "V":
    %              f(<X>) =~ <f(X)> - (V/2)*<g(X)> =~ <2*f(X) - 0.5*(f(X+a)+f(X-a))>.
    % Note that, for indep. errors in "X" (as assumed), we replace "g" by Laplacian[f],
    % and, corresp., "2f(X) - 0.5*(f(X+a)+f(X-a))" by
    %              "(dim+1)*f(X) - 0.5*sum[j=1:dim](f(X+a*e[j])+f(X-a*e[j]))", where
    % "e[j]" = unit vector along "j"-th axis.
    dmtx = 0;
        for row = 1:dim
            ones(size(POSNS,1),1) * [zeros(1,row-1) NOISE_SDS(row) zeros(1,dim-row)];
                % >> "size(ans)" = "[number-of-POSNS, dim]" = size(POSNS). <<
            dmtx = dmtx + (design_poly(POSNS+ans,ORDER)+design_poly(POSNS-ans,ORDER));
        end
        dmtx = (dim+1)*design_poly(POSNS,ORDER) - 0.5*dmtx;
        return
    end
end     % |Noise>

% Optimize for ORDER<3 using "dmtx2":
dmtx = [ones(size(POSNS,1),1) POSNS];           % Constant & linear terms.

if ORDER > 1,
    % Optimize for all ORDER>1:
currtms = POSNS;
offsets = ones(1,dim);

for deg = 2:ORDER       % <Degree|
    prevtms = currtms;
    currtms = [];
```

```
        nprevcols = size(prevtms,2);
        startcol = 1;
        ncolsleft = nprevcols;
        for k = 1:dim
            currtms = [currtms (POSNS(:,k)*ones(1,ncolsleft)).*prevtms(:,startcol:nprevcols)];
            startcol = startcol + offsets(k);
            ncolsleft = ncolsleft - offsets(k);
        end % Update "offsets" ("integrate" previous degree: 1 -> 2 -> 3 -> 4):
        for k = dim-1:-1:1
            offsets(k) = offsets(k) + offsets(k+1);
        end dmtx = [dmtx currtms];
    end             % |Degree>
end
```

What is claimed is:

1. A method for estimating the topological dimension of a set of data points representing a nonlinear system response, each data point having the same number of coordinates, the method comprising the steps of:
   identifying a maximal set of non-redundant, nonlinear single-constraint fits to data points which are in the neighborhood of a predetermined base point, in which the gradient of each fit in the neighborhood of the base point identifies a constrained direction;
   estimating the number of constraints in the neighborhood of the base point to be the same as the number of such constrained directions that are linearly independent;
   estimating the topological dimension of the set of data points to be the original number of coordinates of the data minus the estimated number of constraints;
   wherein the step of identifying a set of fits further comprises the step of:
      using a matrix decomposition technique to find singular values and singular vectors, or eigenvalues and eigenvectors, of a design matrix formed from basis functions constructed from the data values; and
   wherein each fit is a linear combination of a set of basis functions for which the zero-contours of the fit, that is, the curves at which the fit has the value zero, pass near the data points and a set of individual coefficients multiplying the individual basis functions, wherein the coefficients of the basis functions are the components of singular vectors obtained from a decomposition of the design matrix.

2. A method as in claim 1 wherein the step of identifying the number of constraints further comprises the step of:
   attenuating fits that have near-zero gradients at the base point.

3. A method as in claim 1 wherein the matrix decomposition technique is a singular value decomposition of the matrix.

4. A method as in claim 1 wherein the matrix decomposition technique is an eigenvector decomposition of the matrix product of the transpose of the matrix and the matrix itself.

5. A method as in claim 1 wherein the step of estimating the number of constraints additionally comprises the step of:
   weighting the gradients by a weighting factor which depends upon an uncertainty level in the data points, to effectively retain only statistically significant gradient terms.

6. A method as in claim 1 wherein the step of estimating the number of constraints additionally comprises the step of:
   weighting the gradients by a weighting factor which depends both upon an uncertainty level in the data points and the number of independent basis functions, to effectively retain only statistically significant gradient terms.

7. A method as in claim 1 wherein the estimated number of constraints is reduced by excluding directions that are known in advance to be unconstrained.

8. A method as in claim 1 wherein data points near or at the base point may be filtered or projected in such a way as to satisfy the constraints.

9. A method for estimating the topological dimension of a set of data points representing a nonlinear system response, each data point having the same number of coordinates, the method comprising the steps of:
   identifying a maximal set of non-redundant, nonlinear single-constraint fits to data points which are in the neighborhood of a predetermined base point, in which the gradient of each fit in the neighborhood of the base point identifies a constrained direction;
   estimating the number of constraints in the neighborhood of the base point to be the same as the number of such constrained directions that are linearly independent;
   estimating the topological dimension of the set of data points to be the original number of coordinates of the data minus the estimated number of constraints
   wherein, optionally, each direction that is nor among those constrained weighted by a factor which reflects a confidence level in the method for estimating the topological dimension.

10. A method as in claim 9 wherein the step of identifying the number of constraints further comprises the step of:
    attenuating fits that have near-zero gradients at the base point.

11. A method as in claim 9 wherein the step of estimating the number of constraints in the neighborhood of the base point increases the number of constraints to accomodate:
    constraints that are consistent with data points that have been mis-measured due to noise.

12. A method as in claim 9 wherein the step of estimating the number of constraints additionally comprises the step of:
    weighting the gradients by a weighting factor which depends upon an uncertainty level in the data points, to effectively retain only statistically significant gradient terms.

13. A method as in claim 9 wherein the step of estimating the number of constraints additionally comprises the step of:
    weighting the gradients by a weighting factor which depends upon the number of independent basis functions allowed for the fits.

14. A method as in claim 9 wherein the step of estimating the number of constraints additionally comprises the step of:
    weighting the gradients by a weighting factor which depends both upon an uncertainty level in the data points and the number of independent basis functions, to effectively retain only statistically significant gradient terms.

15. A method as in claim 9 wherein the estimated number of constraints is reduced by excluding directions that are identified, in advance, as being unconstrained.

16. A method as in claim 11 wherein a level of noise may be different for each mis-measured data point.

17. A method as in claim 9 wherein data points near or at the base point may be filtered or projected in such a way as to satisfy the constraints.

* * * * *